(12) United States Patent
Okabe et al.

(10) Patent No.: US 7,570,331 B2
(45) Date of Patent: Aug. 4, 2009

(54) LIQUID CRYSTAL DISPLAY

(75) Inventors: Masato Okabe, Tokyo (JP); Naoko Sawatari, Tokyo (JP); Makoto Ishikawa, Tokyo (JP)

(73) Assignee: Dai Nippon Printing Co., Ltd., Tokyo-to (JP)

( * ) Notice: Subject to any disclaimer, the term of this patent is extended or adjusted under 35 U.S.C. 154(b) by 508 days.

(21) Appl. No.: 11/148,494

(22) Filed: Jun. 9, 2005

(65) Prior Publication Data

US 2006/0038949 A1    Feb. 23, 2006

(30) Foreign Application Priority Data

Jun. 11, 2004    (JP)    ............... 2004-174798

(51) Int. Cl.
  *G02F 1/1337* (2006.01)
  *G02F 1/141* (2006.01)
  *G02F 1/13* (2006.01)
(52) U.S. Cl. ............... 349/123; 349/133; 349/172
(58) Field of Classification Search ............ 349/123, 349/96, 172, 133; 428/1.1
  See application file for complete search history.

(56) References Cited

U.S. PATENT DOCUMENTS 5,085,498 A * 2/1992 Yamamoto et al. ......... 349/123
6,411,354 B1 6/2002 Lavrentovich et al.
2005/0068476 A1 * 3/2005 Okabe ......................... 349/96
2006/0082719 A1 * 4/2006 Okabe et al. ................ 349/172
2006/0083865 A1 * 4/2006 Okabe et al. ................ 428/1.1

FOREIGN PATENT DOCUMENTS

JP    2006058517 A * 3/2006
JP    2006058518 A * 3/2006

OTHER PUBLICATIONS

Nonaka, T., Li, J., Ogawa, A., Hornung, B., Schmidt, W., Wingen, R., and Dubal, H., Liquid Crystals, 1999, vol. 26, No. 11, 1599-1602, Material charcateristics of an active matrix LCD based upon chiral smectics.
Patel, J., and Goodby, J.W., 1986, J. Appl. Phys., 59, (7), 2355-2360, Alignment of liquid crystals which exhibit cholesteric to smectic C* phase transitions.

* cited by examiner

*Primary Examiner*—Julie Ngo
(74) *Attorney, Agent, or Firm*—Ladas & Parry LLP

(57) ABSTRACT

A liquid crystal display including two alignment substrates having a base material, an electrode layer and alignment layer, with a ferroelectric liquid crystal interposed therebetween. One of the two alignment layers for controlling the alignment of the ferroelectric liquid crystal has a column structure with plate-like molecules having the photo dichroism in the visible light range laminated with the normal directions of the plate-like molecules oriented in a certain direction, and it is provided a columnar alignment layer having the alignment function and the polarizing function.

15 Claims, 4 Drawing Sheets

LIQUID CRYSTAL DISPLAY

FIELD OF THE INVENTION

The present invention relates to liquid crystal display using ferroelectric liquid crystal.

DESCRIPTION OF THE RELATED ART

Since liquid crystal display has features that it is thin and is low in power consumption and other features, the use has been expanding in various articles from large-sized displays to portable information terminals and the development has been actively made. Conventionally, for liquid crystal display, a TN system, an STN multiplex driving system, an active matrix driving system in which thin film transistors (hereinafter, it may be referred to as "TFT element") are used in TN, and others have been developed and made practicable. However, nematic liquid crystal is used therein; therefore, the response speed of the liquid crystal material is as small as several milliseconds to several tens of milliseconds and it cannot be said that these sufficiently cope with display of moving images.

On the other hand, ferroelectric liquid crystal exhibits a very short response time in order of microseconds, thus ferroelectric liquid crystal is suitable for high-speed devices. As such ferroelectric liquid crystal, there is well known a bistable liquid crystal suggested by Clark and Lagerwall and which has two stable states when no voltage is applied thereto. However, the liquid crystal has a problem that the liquid crystal has memory property but graduation display cannot be attained since the switching thereof is limited to two states, namely, bright and dark states.

In recent years, attention has been paid to ferroelectric liquid crystal, in which the liquid crystal layer thereof is stable in a single state (hereinafter referred to as "monostable") when no voltage is applied thereto, as a liquid crystal which makes it possible to attain graduation display by the matter that the director (the inclination of the molecule axis) of the liquid crystal is continuously changed by a change in applied voltage so as to analogue-modulate the light transmission thereof (NONAKA, T., LI, J., OGAWA, A., HORNUNG, B., SCHMIDT, W., WINGEN, R., and DUBAL, H., 1999, Liq. Cryst., 26, 1599).

As a method for having the mono-stability of the ferroelectric liquid crystal, there are a polymer stabilizing method for adding a ultraviolet curable monomer in the liquid crystal material, injecting into a cell, and curing so as to stabilize the alignment of the liquid crystal, or a method for raising the temperature of the ferroelectric liquid crystal to a temperature higher than the phase transition point, and then cooling down gradually.

However, according to the polymer stabilizing method, problems are involved in that the process is complicated, the driving voltage is high, or the like. Moreover, according to the latter method not using the polymer stabilizing method, two different domains in the layer normal direction (hereinafter it may also be referred to as the "double domains") can easily be formed so as to give rise to the grave problem of the display with the black and white inverted at the time of the drive. As to the double domains, although a method for having the mono domain by the electric field induced technique (, which uses DC voltage during cooling process) of gradually cooling while applying the voltage, is known (PATEL, J., and GOODBY, J. W., 1986, J. Appl. Phys., 59, 2355.), there is a problem of the alignment disturbance in the case the ferroelectric liquid crystal again has a temperature higher than the phase transition point, and thus the practical usability is low.

Moreover, as a technique for align the liquid crystal, there also are the rubbing process, the photo alignment method, or the like. According to the rubbing process, which provides the alignment ability by rubbing the polyimide-coated surface, it is difficult to have the evenness at the time of processing a large area, and moreover, there are the problems of generating the static electricity, the dusts, or the like. On the other hand, according to the photo alignment method, which provides the alignment ability by arranging the molecules in a specific direction by irradiating a compound having the photo alignment property with an ultraviolet ray, or the like, it is advantageous in that the quantitative alignment process can be controlled without generation of the static electricity or the dusts, however, a problem is involved in that the device cost is required due to the need of the exposing process.

On the other hand, such liquid crystal display comprises two alignment substrates having an electrode layer and an alignment layer on a base material, so as to have the alignment layers face with each other, with the space between the alignment substrates filled with a liquid crystal. Furthermore, in general, a polarizing plate for changing an incident non polarized light beam to a linear polarized light beam is attached to the outside of the base materials.

Accordingly, since the liquid crystal display utilizes the birefringence effect, for the visualization, a polarizing plate is required. However, since the polarizing plate is attached to the outside of the base material, scattering of the light is generated at the interface between the base material and the polarizing plate so that a problem arises in that the light transmission can easily be lowered.

Moreover, recently, particularly for the usage in the portable terminal, or the like, miniaturization is demanded so that a thin shape and a light weight are required for the liquid crystal display. It is preferable to meet the demand, which would further lead to the cutback of the production cost.

SUMMARY OF THE INVENTION

The present invention has been achieved in view of the problems, and the main object is to restrain the decline of the light transmission by solving the light scattering generated at the interface between the polarizing plate and the liquid crystal display by providing the alignment function of controlling the alignment of the ferroelectric liquid crystal and the polarizing function of changing the non polarized light beam to the linear polarized light beam to one of the alignment layers, and furthermore, to achieve the thin shape and the light weight of the liquid crystal display, and achieve the cutback of the production cost.

As a result of the elaborate discussion on the circumstances, the present inventors have found out that the alignment function of controlling the alignment of the ferroelectric liquid crystal and the polarizing function of changing the non polarized light beam to the linear polarized light beam can be provided to the alignment layer by a simple method of utilizing the self organization of plate-like molecules having the photo dichroism in a visible light range so as to enable the visualization without using the polarizing plate on the alignment layer side.

That is, the present invention provides a liquid crystal display comprising a first alignment substrate having a first base material, a first electrode layer formed on the first base material and a first alignment layer formed on the first electrode layer, and a second alignment substrate having a second base material, a second electrode layer formed on the second base material, and a second alignment layer formed on the second electrode layer, disposed such that the first alignment layer and the second alignment layer face with each other, with a ferroelectric liquid crystal interposed between the first alignment substrate and the second alignment substrate, wherein the first alignment layer has a column structure with plate-like molecules having a photo dichroism in a visible light range laminated with the normal directions of the plate-like molecules aligned in a certain direction, and it is a columnar alignment layer having the alignment function and the polarizing function.

According to the liquid crystal display of the present invention, since the first alignment layer has a column structure with plate-like molecules having a photo dichroism in a visible light range laminated with the normal directions of the plate-like molecules oriented in a certain direction, and it is a columnar alignment layer having the alignment function and the polarizing function, visualization can be enabled without using a polarizing plate on the first alignment layer side so that scattering of the light beam generated at the interface of the liquid crystal display and the polarizing plate can be solved so as to restrain the deterioration of the light transmission. Moreover, since the polarizing plate needs not be used on the first alignment layer side accordingly, a thin shape and the light weight of the liquid crystal display can be achieved, and furthermore, the production cost can be cut back. Since such a columnar alignment layer is formed, utilizing the self organization of the plate-like molecules mentioned above, it can be formed by a simple method without the need of an alignment process such as the rubbing process and the photo alignment process, and thus it is highly practical.

In the invention, it is preferable that the columnar alignment layer comprises a resin layer with a concave part or a convex part having a predetermined width formed in a pattern on the surface, and the column structure formed along the concave part of the resin layer. Since the column structure is formed along the concave part of the resin layer, the column structure can be aligned in a certain direction.

Moreover, according to the invention, it is preferable that the plate-like molecules show a lyotropic liquid crystal phase in an aqueous solution. Since the plate-like molecules form a column structure in the aqueous solution by the self organization so as to show the lyotropic liquid crystal phase, by coating a columnar alignment layer forming coating solution containing the plate-like molecules, the column structure can be aligned easily. Moreover, since the plate-like molecules are water soluble, the fixing process for fixing the column structure can be facilitated.

Furthermore, according to the invention, it is preferable that the second alignment layer is a photo alignment layer. Since a photo alignment layer is used for the second alignment layer, the quantitative alignment process can be enabled without the problems of the static electricity, the dusts, or the like.

Still further, according to the invention, it is preferable that the ferroelectric liquid crystal shows the mono-stability driving characteristics. Since the ferroelectric liquid crystal shows the mono-stability driving characteristics, the graduation display can be enabled so that a highly precise liquid crystal display for the color display can be obtained.

Furthermore, according to the invention, it is preferable that the ferroelectric liquid crystal shows a phase transition sequence without the smectic A phase in the temperature cooling process. A ferroelectric liquid crystal showing such a phase transition sequence tends to show the mono-stability driving characteristics, and by using such a ferroelectric liquid crystal, a highly precise liquid crystal display for the color display can easily be obtained.

Moreover, it is preferable that the invention comprises thin film transistors (TFT elements) in the first electrode layer or the second electrode layer of the active matrix drive. By adopting the active matrix system using TFT elements, it becomes possible to switch on or off target pixels surely to give high-quality display. Furthermore, it is possible to combine a TFT substrate, in which TFT elements are arranged in a matrix form on one of the substrates, with a common electrode substrate, in which a common electrode is formed in the whole of the display section of the other substrate, to form a micro color filter in which TFT elements are arranged in a matrix form between the common electrode of the common electrode substrate and the substrate, and use the resultant as color liquid crystal display.

Moreover, the invention is preferably driven by a field sequential color system for the following reason: the liquid crystal display of the present invention have a large response speed and makes it possible to align the ferroelectric liquid crystal therein without forming any alignment defect; therefore, when the display element is driven by the field sequential color system, bright and highly precise display of color moving images which has a wide field angle can be realized at low costs and low power consumption.

According to the present invention, visualization can be enabled without using a polarizing plate on the first alignment layer side so that scattering of the light beam generated at the interface of the liquid crystal display and the polarizing plate can be solved so as to restrain the deterioration of the light transmission. Moreover, since the polarizing plate needs not be used on the first alignment layer side accordingly, a thin shape and the light weight of the liquid crystal display can be achieved, and furthermore, the production cost can be cut back. Since such a columnar alignment layer is formed, utilizing the self organization of the plate-like molecules mentioned above, it can be formed by a simple method without the need of an alignment process such as the rubbing process and the photo alignment process, and thus it is highly practical.

DESCRIPTION OF THE PREFERRED EMBODIMENT

The liquid crystal display of the present invention will be described hereinafter. The liquid crystal display of the present invention comprises a first alignment substrate having a first base material, a first electrode layer formed on the first base material and a first alignment layer formed on the first electrode layer, and a second alignment substrate having a second base material, a second electrode layer formed on the second base material, and a second alignment layer formed on the second electrode layer, disposed such that the first alignment layer and the second alignment layer face with each other, with a ferroelectric liquid crystal interposed between the first alignment substrate and the second alignment substrate, wherein the first alignment layer has a column structure with plate-like molecules having a photo dichroism in a visible light range laminated with the normal directions of the plate-like molecules aligned in a certain direction, and it is a columnar alignment layer having the alignment function and the polarizing function.

According to the liquid crystal display of the present invention, since the first alignment layer has a column structure with plate-like molecules having a photo dichroism in a visible light range laminated with the normal directions of the plate-like molecules oriented in a certain direction, and it is a columnar alignment layer having the alignment function and the polarizing function, visualization can be enabled without using a polarizing plate on the first alignment layer side so that scattering of the light beam generated at the interface of the liquid crystal display and the polarizing plate can be solved so as to restrain the deterioration of the light transmission. Moreover, since the polarizing plate needs not be used on the first alignment layer side accordingly, a thin shape and the light weight of the liquid crystal display can be achieved, and furthermore, the production cost can be cut back. Since such a columnar alignment layer is formed, utilizing the self organization of the plate-like molecules mentioned above, it can be formed by a simple method without the need of an alignment process such as the rubbing process and the photo alignment process, and thus it is highly practical.

Figure 1:
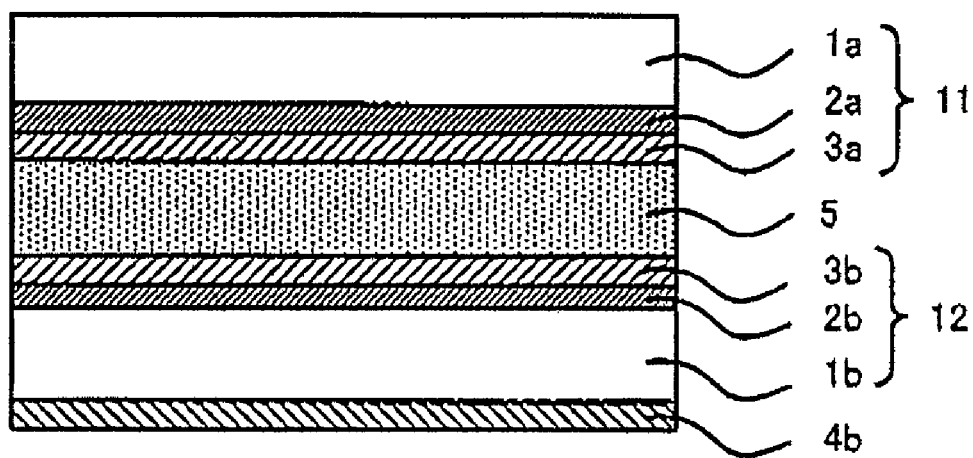
FIG. 1 is a schematic sectional view illustrating one example of the liquid crystal display of the present invention.

Such a liquid crystal display of the present invention will be explained with reference to the drawings. FIG. 1 is a schematic sectional view showing an example of the liquid crystal display of the present invention. As shown in FIG. 1, a first alignment substrate 11 having a first base material 1a, a first electrode layer 2a formed on the first base material 1a and a first alignment layer 3a formed on the first electrode layer 2a, and a second alignment substrate 12 having a second base material 1b a second electrode layer 2b formed on the second base material 1b and a second alignment layer 3b formed on the second electrode layer 2b are formed and disposed such that the first alignment substrate 11 and the second alignment substrate 12 are disposed so as to have the first alignment layer 3b and the second alignment layer 3b face with each other. Moreover, a ferroelectric liquid crystal is interposed between the first alignment layer 3a and the second alignment layer 3b so as to provide a liquid crystal layer 5.

According to the liquid crystal display of the present invention having such a structure, the first alignment layer 3a has a column structure with plate-like molecules having a photo dichroism in a visible light range laminated with the normal directions of the plate-like molecules oriented in a certain direction, and it is a columnar alignment layer having the alignment function and the polarizing function. Hereinafter, the columnar alignment layer will be explained.

Figure 2A:
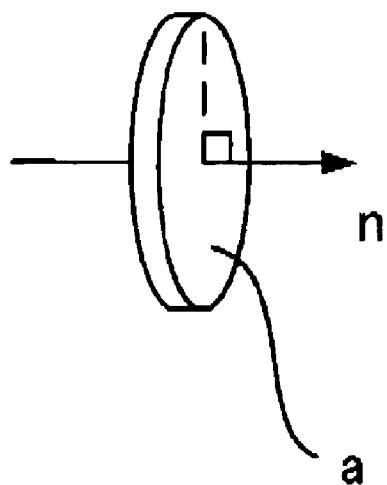
FIGS. 2A and 2B are a diagram for explaining the plate-like molecules and the column structure of the columnar alignment layer used in the present invention.
Figure 2B:
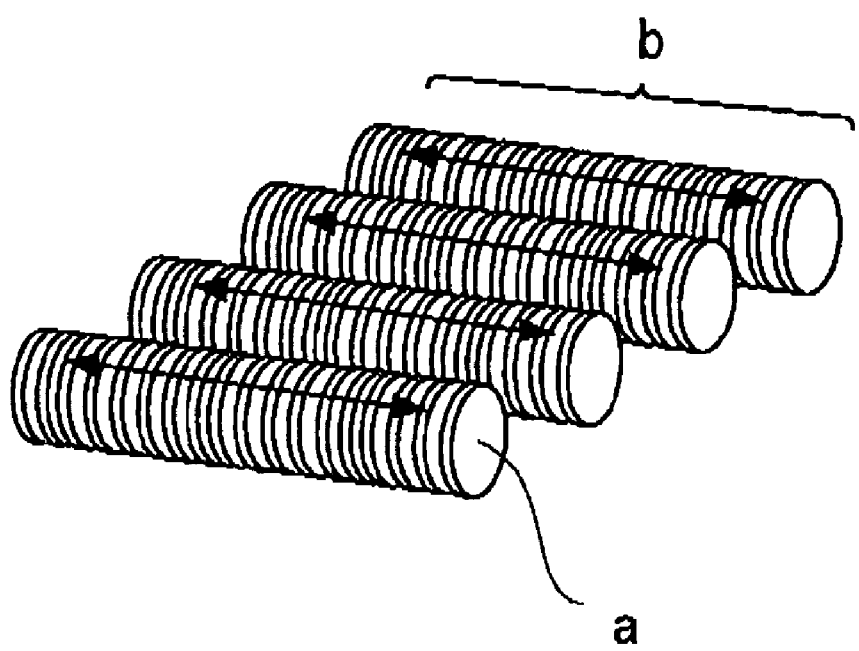

FIG. 2A is a diagram showing the model structure of the plate-like molecules having a photo dichroism in a visible light range used in the present invention and the normal direction. FIG. 2B is a schematic perspective view of the columnar alignment layer. As shown in FIG. 2B, according to the columnar alignment layer, the plate-like molecules are laminated with the normal directions n of the plate-like molecules a oriented in a certain direction so as to form a column structure b. By arranging a plurality of such columnar structures b, a columnar alignment layer is provided.

In the present invention, since the columnar alignment layer is provided by arranging the plate-like molecules a, the axial directions of the columns of the plurality of the column structures b of the columnar alignment layer are oriented in a certain direction. According to the interaction of the columnar structures b and the ferroelectric liquid crystal, the alignment function for controlling the alignment of the ferroelectric liquid crystal can be provided.

Moreover, since the axial directions of the columns of the plurality of the column structures b of the columnar alignment layer are aligned accordingly in a certain direction, the columnar alignment layer is provided with the anisotropy along the column axial direction. Since the plate-like molecules a comprising the columnar structures b have the photo dichroism in the visible light range, the columnar alignment layer is further provided with the polarizing function.

In the present invention, since the columnar alignment layer has the alignment function and the polarizing function, a polarizing plate needs not be provided on the side with the columnar alignment layer out of the two alignment substrates, scattering of the light beam generated at the interface of the liquid crystal display and the polarizing plate can be solved so as to restrain the deterioration of the light transmission, a thin shape and the light weight of the liquid crystal display can be achieved, and furthermore, the production cost can be cut back.

Moreover, since such a columnar alignment layer is formed, utilizing the self organization of the plate-like molecules, it can be formed by a simple method without the need of an alignment process, and thus it is highly practical.

As mentioned above, since the liquid crystal display utilizes the birefringence effect, a polarizing plate 4b is used for the second alignment substrate 12 for the visualization. Although the polarizing plate 4b is formed outside the second base material 1b in FIG. 1, the polarizing plate 4b may be formed inside the second base material 1b. The position thereof is not particularly limited, however, it is disposed such that the polarizing direction is perpendicular to the normal direction of the plate-like molecules comprising the columnar alignment layer as the first alignment layer 3a. According to the arrangement, only the light beams polarized in the liquid crystal molecule alignment direction can be transmitted.

Figure 3:
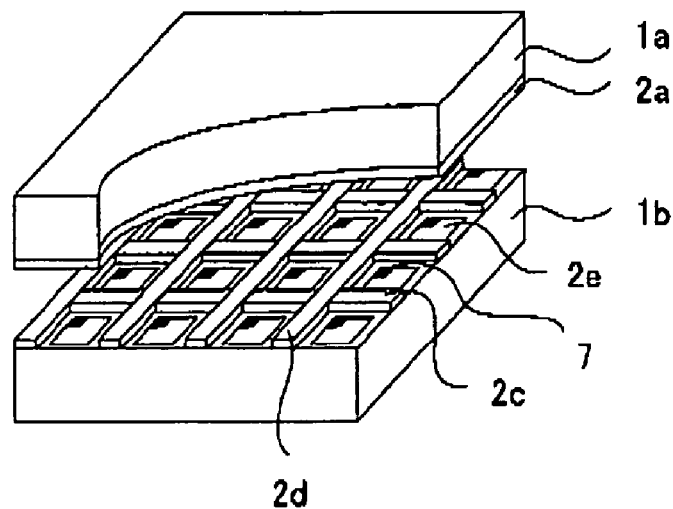
FIG. 3 is a schematic perspective view illustrating one example of the liquid crystal display of the present invention.
Figure 4:
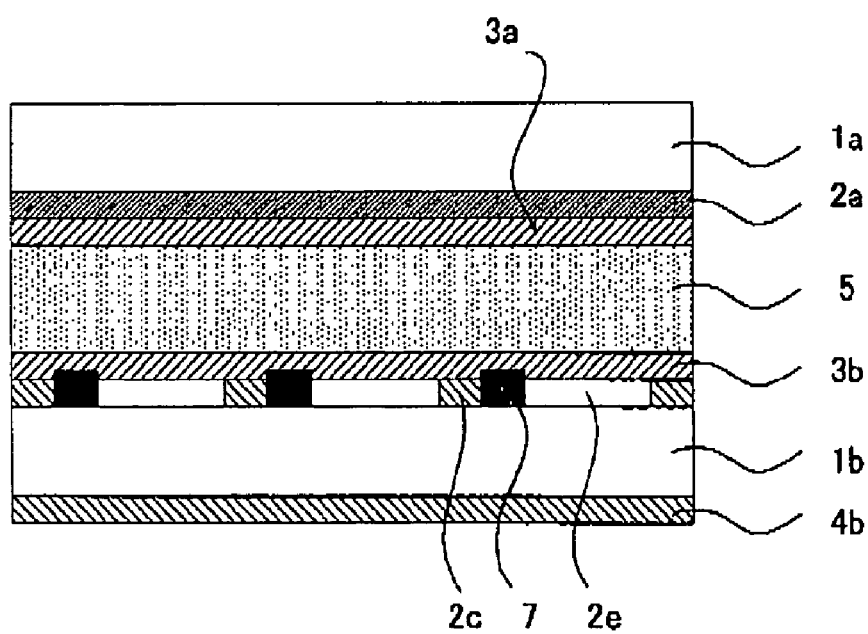
FIG. 4 is a schematic sectional view illustrating the example of the liquid crystal display of the present invention.

It is preferable that the liquid crystal display of the present invention comprises a combination of one of the substrates as a TFT substrate with the TFT elements disposed in a matrix and the other substrate as a common electrode substrate with the common electrode formed in the entire area so as to be of the active matrix drive as shown in, for example, FIGS. 3 and 4. Since the liquid crystal display of the present invention is of the active matrix drive, a targeted pixel can be turned on or off surely, a high quality display can be obtained. Such a liquid crystal display of the active matrix drive using the TFT elements will be explained hereinafter.

FIG. 3 is a schematic perspective view showing an example of the liquid crystal display of the present invention, and FIG. 4 is a schematic sectional view thereof. In FIG. 3, the first alignment substrate is a common electrode substrate with the first electrode layer 2a provided as the common electrode, and on the other hand, the second alignment substrate is a TFT substrate with the second electrode layer 2b having a x electrode 2c, a y electrode 2d and a pixel electrode 2e. In the liquid crystal display, the x electrodes 2c and the y electrodes 2d are arranged each vertically and laterally. By applying a signal to these electrodes, the TFT elements 7 are operated so as to drive the ferroelectric liquid crystal. The intersections of the x electrodes 2c and the y electrodes 2d are insulated by an unshown insulating layer so that the signal for the x electrodes 2c and the signal for the y electrodes 2d can be operated independently. A portion surrounded by the x electrodes 2c and the y electrodes 2d is a pixel as the smallest unit for driving the liquid crystal display of the present invention. In each pixel, at least one TFT element 7 and a pixel electrode 2e are formed. According to the liquid crystal display of the present invention, by successively applying a voltage to the x electrodes 2c and the y electrodes 2d, the TFT element 7 of each pixel can be operated. In FIG. 3, the liquid crystal layer, the first alignment layer, the second alignment layer and the polarizing plate are omitted.

The liquid crystal display of the present invention can be used as a color liquid crystal display by adopting the color filter system or the fields sequential color system. In particular, it is preferably driven by the field sequential color system. The field sequential color system is for enabling the color display by switching on or off the liquid crystal synchronously with flickering of the LED of the three colors of red, green and blue without the use of a color filter. Thereby, a bright, highly precise color moving image display can be realized with a low power consumption, a low cost and a wide view angle.

In this case, the ferroelectric liquid crystal is preferably one showing the mono-stability driving characteristics. It is particularly preferably one of the half-V-shaped drive with the liquid crystal molecules operated only at the time either a positive voltage or a negative voltage is applied. As the ferroelectric liquid crystal, by using such material, the light leakage at the time of the dark part operation (black and white shutter aperture closed) can be reduced so that the opening time as the black and white shutter can be made sufficiently long. Thereby, each color to be switched by a time duration can be displayed further brightly so that a bright color liquid crystal display can be obtained.

On the other hand, in the case of providing a color liquid crystal display by adopting the color filter system, a micro color filter disposed as a matrix of the TFT elements 7 may be formed between the first electrode layer 2a as the common electrode and the substrate 1a.

Accordingly, the liquid crystal display of the present invention comprises the first alignment substrate and the second alignment substrate, disposed to face each other, with the ferroelectric liquid crystal interposed between the alignment substrates. Each constituent member of the liquid crystal display of the present invention having these structures will be explained hereinafter.

(1) First Alignment Substrate

First, the first alignment substrate used in the present invention will be explained. In the present invention, the first alignment substrate comprises the first base material, the first electrode layer formed on the first base member, and the first alignment layer formed on the first electrode layer.

a. First Alignment Layer

The first alignment layer used in the present invention has a column structure with plate-like molecules having a photo dichroism in a visible light range laminated with the normal directions of the plate-like molecules oriented in a certain direction, and it is a columnar alignment layer having the alignment function and the polarizing function.

Accordingly, the columnar alignment layer used in the present invention has a column structure. According to the interaction between the column structure and the ferroelectric liquid crystal, the alignment function for controlling the alignment of the ferroelectric liquid crystal can be provided. Moreover, since the plate-like molecules comprising the column structure have the photo dichroism in a visible light range as mentioned above and the columnar alignment layer has the anisotropy in the column axial direction, the polarizing function can also be provided.

Since the columnar alignment layer is formed, utilizing the self organization of the plate-like molecules, the production process is simple without the need of the alignment process such as the rubbing process and the photo alignment process, and thus it is advantageous in that the apparatus cost can be reduced. For example, by forming a coating film while coating a columnar alignment layer forming coating solution and drying the coating film so as to be fixed, the columnar alignment layer having the column structure can be formed. The method for forming the columnar alignment layer will be described later in detail.

Figure 5:
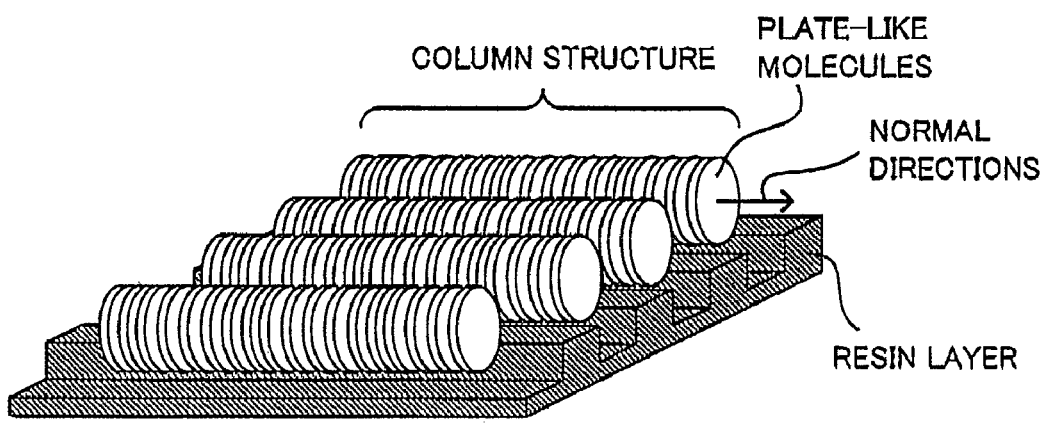
FIG. 5 is a diagram depicting the resin layer with concave or convex part having a predetermined width formed in a pattern.

The columnar alignment layer of the present invention is not particularly limited as long as it has the column structure as mentioned above, and the alignment function and the polarizing function, however, it is preferably one comprising a resin layer with a concave part or a convex part having a predetermined width formed on the surface in a pattern, as shown in FIG. 5, and the column structure formed along the concave part of the resin layer. Since the column structure is formed along the concave part of the resin layer, the column structure can easily be arranged. Hereinafter, the column structure and the resin layer will be explained.

(Column Structure)

First, the column structure comprising the columnar alignment layer will be explained. The column structure used in the present invention comprises the plate-like molecules having the photo dichroism in the visible light range laminated with the normal directions thereof oriented in a certain direction.

The "plate-like molecules" here denote those having at least a plurality of aromatic ring structures with the core portion of the molecules disposed flatly.

The plate-like molecules used in the present invention are not particularly limited as long as they form a column structure by being laminated like a pillar.

As the plate-like molecules, for example, plate-like molecules having a hydrophilic group such as a sulfonic acid group, or plate-like molecules having a hydrophobic group such as a long chain alkyl group can be presented. In particular, it is preferable to use the plate-like molecules having a hydrophilic group. According to the plate-like molecules having a hydrophilic group, since the hydrophilic group is small so that the distance between the adjacent column structures is close, the column structures can be arranged easily. Moreover, by neutralizing the hydrophilic parts of the sulfonic acid group, or the like after coating and drying so as to be poor soluble or insoluble to water, the fixing process can be facilitated.

As the hydrophilic group, sulfonic acid based hydrophilic groups such as a sulfonic acid group, a sodium sulfonate group, an ammonium sulfonate group, a lithium sulfonate group and a potassium sulfonate group, carboxylic acid based hydrophilic groups such as a carboxyl group, a sodium carboxylate group, an ammonium carboxylate group, a lithium carboxylate group, and a potassium carboxylate group, a hydroxyl group, an amino group, or the like can be presented. Among these examples, the sulfonic acid based hydrophilic groups are preferable.

The formation of the column structures by the plate-like molecules can be confirmed by the measurement using a X ray diffractometer.

Among the example, as the plate-like molecules used in the present invention, those capable of forming the column structures in a solution so as to show the lyotropic liquid crystal phase are preferable because the plate-like molecules showing the lyotropic liquid crystal phase in a solution have a high self organization force. For example, by coating a columnar alignment layer forming coating solution containing the plate-like molecules which show the lyotropic liquid crystal phase in a solution, the column structures can easily be oriented, utilizing the self organization of the plate-like molecules.

As the plate-like molecules showing the lyotropic liquid crystal phase in a solution, the plate-like molecules showing the lyotropic liquid crystal phase in an aqueous solution, and the plate-like molecules which show the lyotropic liquid crystal phase in an organic solvent can be presented. The kind of the solutions differs depending on the substituent of the plate-like molecules. In the case the plate-like molecules have a hydrophilic group such as a sulfonic acid group, an aqueous solution is used, and in the case they have a hydrophobic group such as a long chain alkyl group, an organic solvent is used.

In particular it is preferable that the plate-like molecules form a column structure in an aqueous solution and show the lyotropic liquid crystal phase. Since such plate-like molecules form the column structure by the self organization in an aqueous solution and show the lyotropic liquid crystal phase, by coating the columnar alignment layer forming coating solution containing the plate-like molecules, the column structures can easily be aligned. Furthermore, since the plate-like molecules are water soluble, the fixing process for fixing the column structures can be facilitated.

As the specific examples of the plate-like molecules having the photo dichroism in the visible light range and show the lyotropic liquid crystal phase in an aqueous solution, the substances represented by the below-mentioned chemical formulae can be presented.

I

M is a cation.
n is an integer from 2 to 4.

II

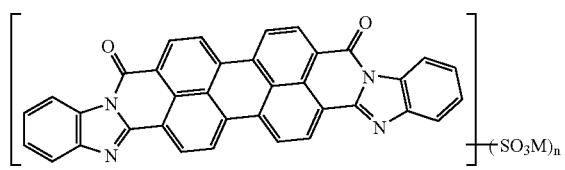

M is a cation.
n is an integer from 2 to 4.

III

M is a cation.
n is an integer from 2 to 4.

IV

M is a cation.
n is an integer from 2 to 4.

V

R is H or Cl.
R' is H or an alkyl group.
M is a cation.
n is an integer from 2 to 4.

M is a cation.
n is an integer from 2 to 4.

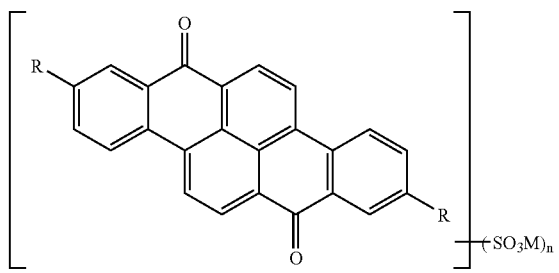
R is H, Br, NHAr, or
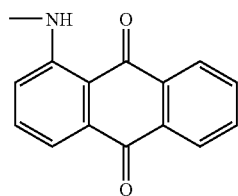
M is a cation.
n is an integer from 2 to 4.
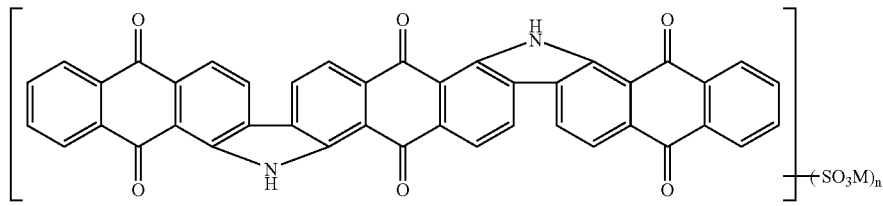
M is a cation.
n is an integer from 2 to 4.
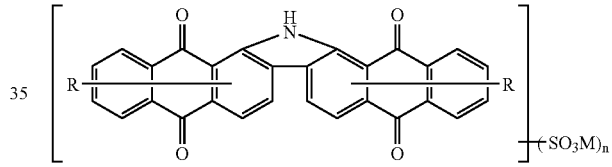
R is H or NHCOPh.
M is a cation.
n is an integer from 2 to 4.
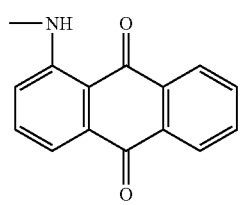
R is H, Br, NHAr, or M is a cation.
n is an integer from 2 to 4.

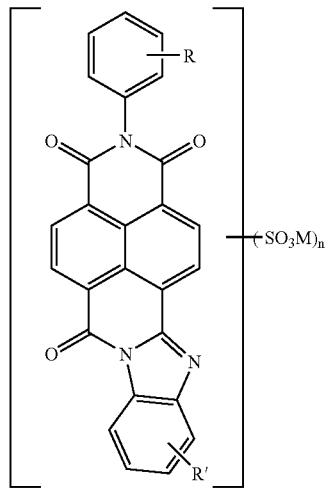

R, R' are H, a halogen, an alkyl group, an alkoxy group, ArNH, or OPh.
M is a cation.
n is an integer from 2 to 4.

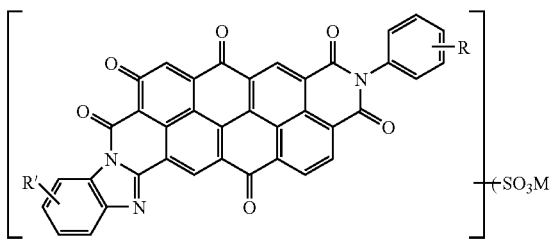

R, R' are H, a halogen, an alkyl group, an alkoxy group, ArNH, or OPh.
M is a cation.
n is an integer from 2 to 4.

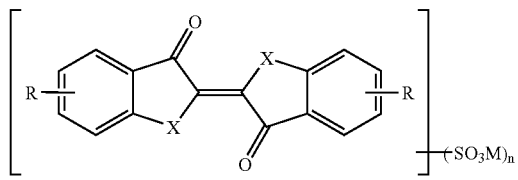

X is NH or S.
R is a halogen or an alkoxy group,
M is a cation.
n is an integer from 2 to 4.

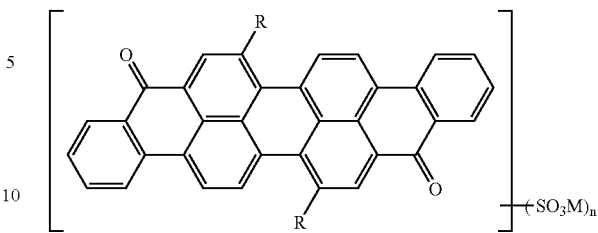

R is H, OH, or $OCH_3$.
M is a cation.
n is an integer from 2 to 4.

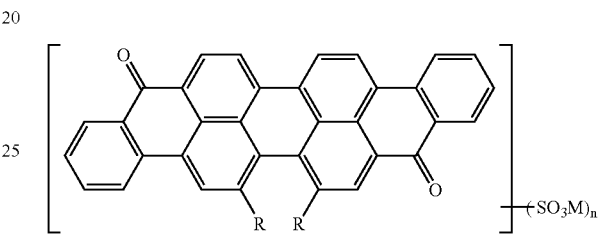

R is H, OH, or $OCH_3$.
M is a cation.
n is an integer from 2 to 4.

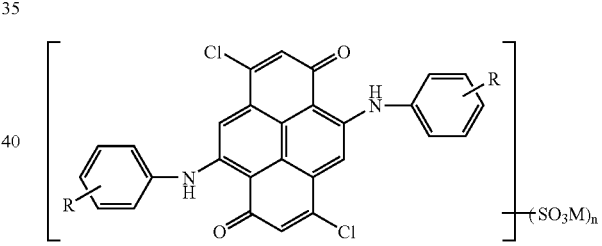

R is H, a halogen, an alkyl group, an alkoxy group, ArNH, or OPh.
M is a cation.
n is an integer from 2 to 4.

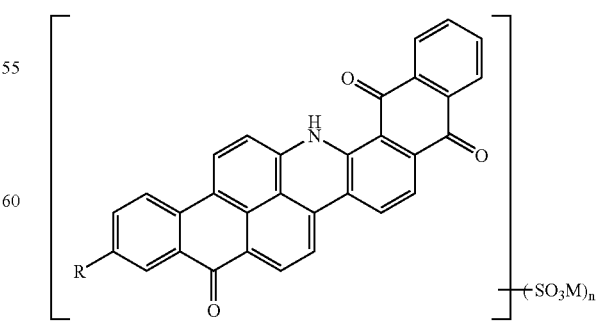

R is H, Br, NHAr, or

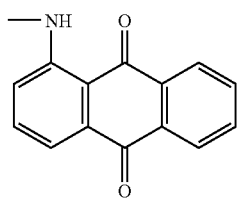
M is a cation.
n is an integer from 1 to 3.
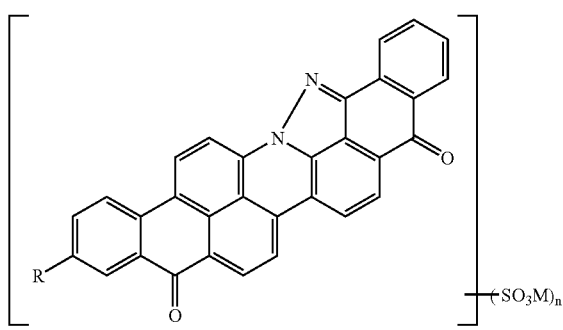
R is H, Br, NHAr, or
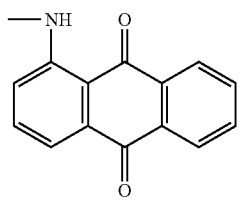
M is a cation.
n is an integer from 2 to 4.
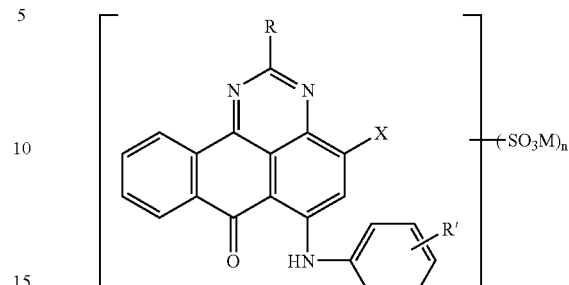
X is H, Br, or SO$_3$M.
R is H or an alkyl group.
R' is H, a halogen, an alkyl group, an alkoxy group, NHPh, or OPh.
M is a cation.
n is an integer from 2 to 4.
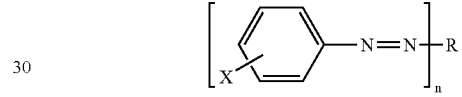
X is COOM or PO(OM)$_2$.
R', R" are H, or a halogen.
Y is NH$_2$ or OM.
M is a cation.
n is 1 or 2.
R is
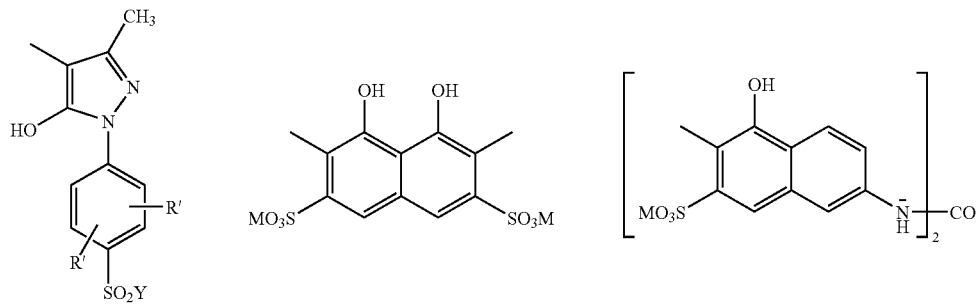
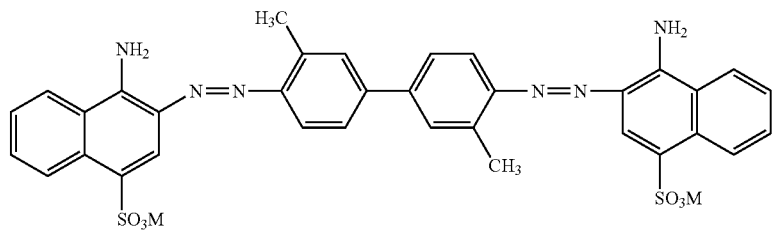
M is a cation.

17
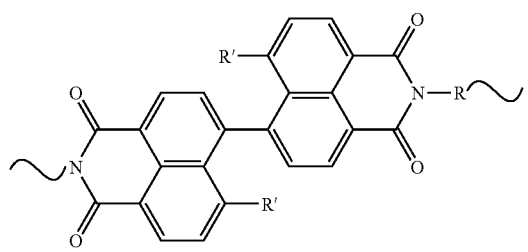
R is
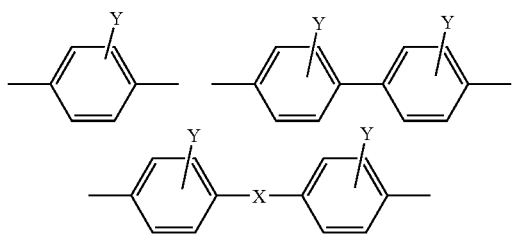
X is O, CH$_2$, NH, CONH, NHCONH, or CH=CH.
Y is H, CH$_3$, CH$_3$O, COOM, or SO$_3$M
R' is H, NO$_2$, COOM, or SO$_3$M.
M is a cation.
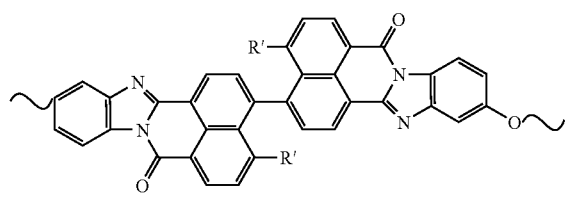
R' is COOM or SO$_3$M.
M is a cation.
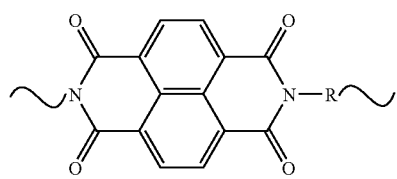
R is
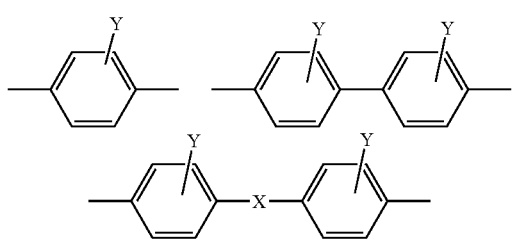
18
X is O, CH$_2$, NH, CONH, NHCONH, or CH=CH.
Y is COOM or SO$_3$M.
M is a cation.
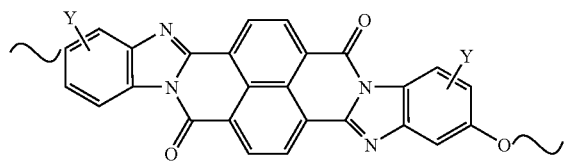
Y is SO$_3$M.
M is a cation.
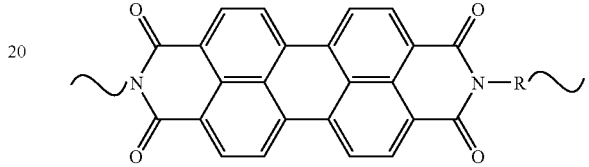
R is
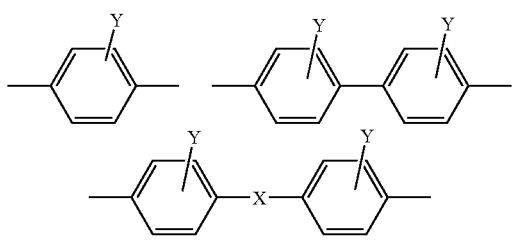
X is O, CH$_2$, NH, CONH, NHCONH, or CH=CH.
Y is COOM or SO$_3$M.
M is a cation,
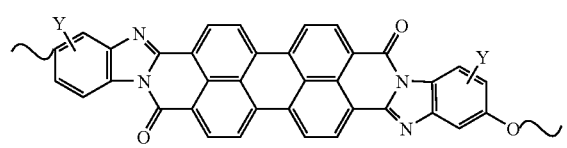
Y is SO$_3$M.
M is a cation.
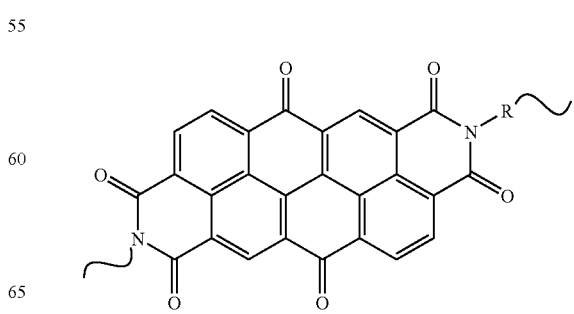

19
R is
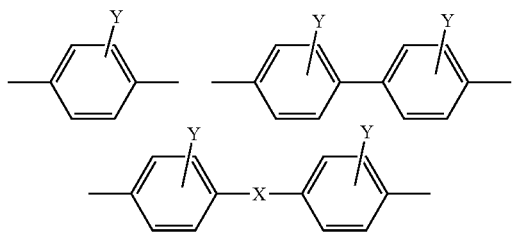
X is O, CH$_2$, NH, CONH, NHCONH, or CH=CH.
Y is COOM or SO$_3$M.
M is a cation.
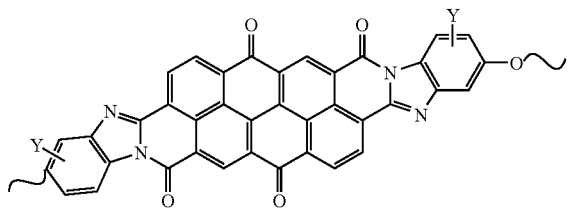
Y is COOM or SO$_3$M.
M is a cation.
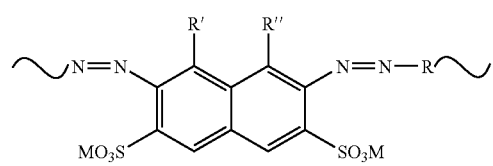
20
R is
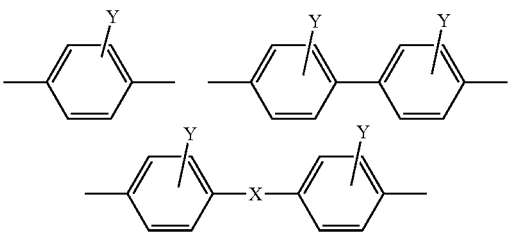
X is O, CH$_2$, NH, CONH, NHCONH, or CH=CH.
Y is H, CH$_3$, CH$_3$O, COOM, or SO$_3$M.
R', R'' are OH or NH$_2$.
M is a cation.
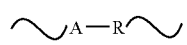
A is one of the following a, b, c, d, e, f, g, or h.
R is
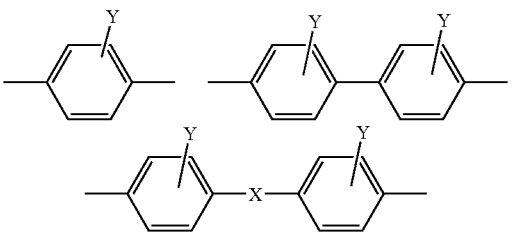
X is O, CH$_2$, NH, CONH, NHCONH, or CH=CH.
Y is COOM or SO$_3$M.
M is a cation.
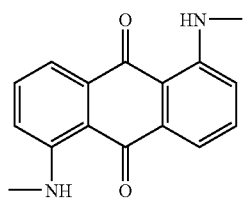
a
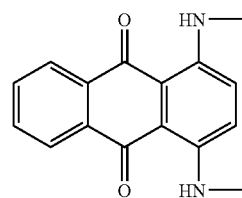
b
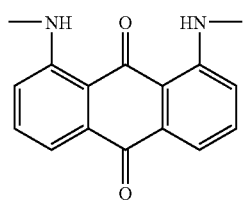
c
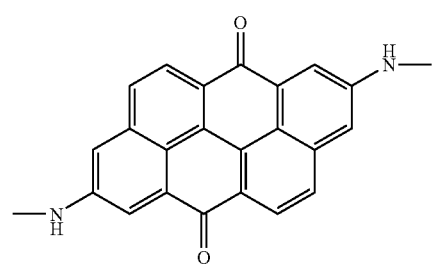
d

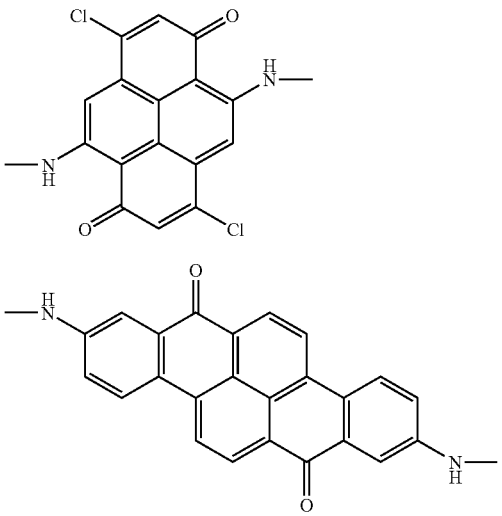
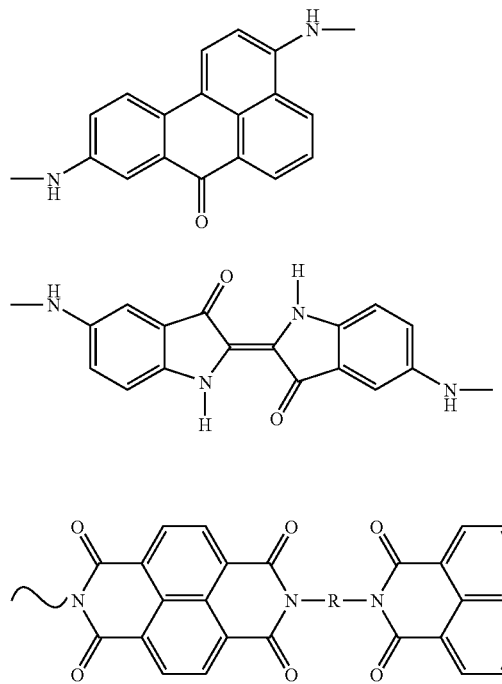
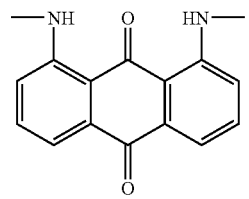
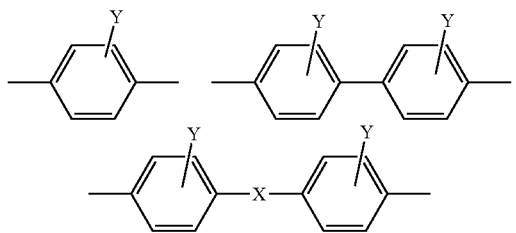
A is one of the following a, b, c, d, e, f, g, or h.
R is
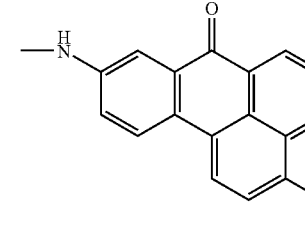
X is O, CH$_2$, NH, CONH, NHCONH, or CH=CH.
Y is COOM or SO$_3$M.
M is a cation.
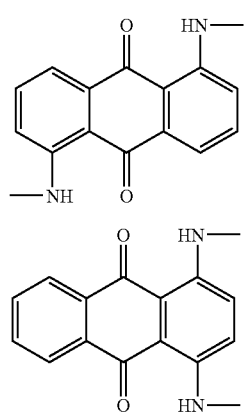

-continued
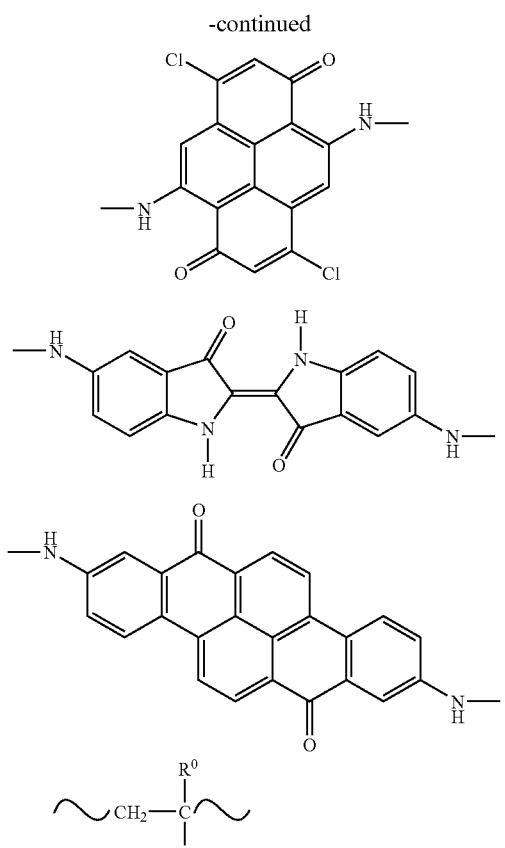
R is
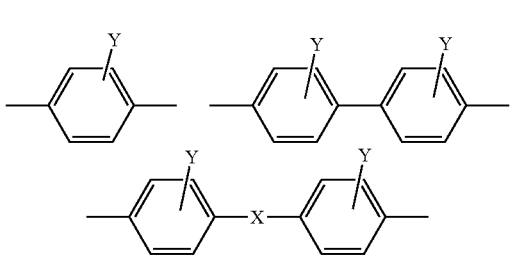
$(CH_2)_3$, $(CH_2)_6$
X is NH or O.
Y is H, $CH_3$, $CH_3O$, COOM, or $SO_3M$.
M is a cation.
$R^o$ is H or $CH_3$.
A is one of the following a, b, c, d, e, or f.
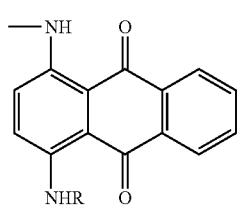
a
-continued
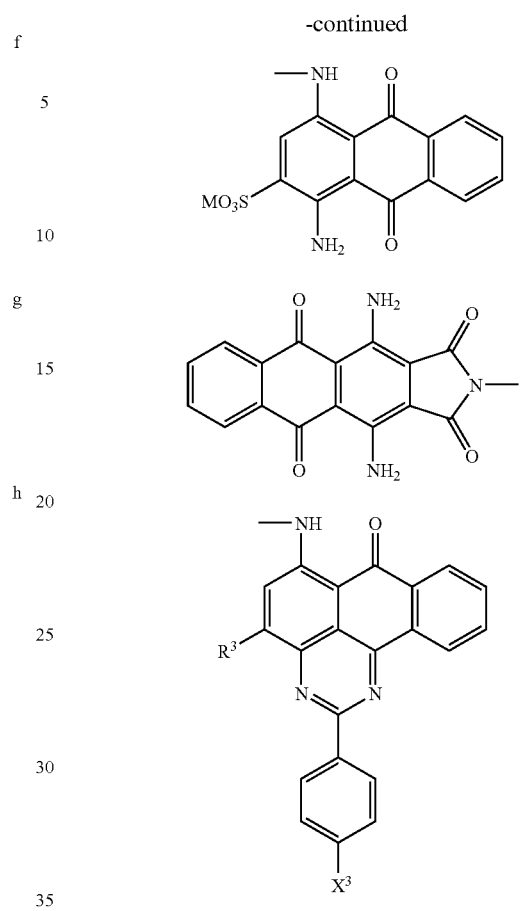
$R^3$ is H, Br, or $SO_3M$.
$X^3$ is H or $SO_3M$.
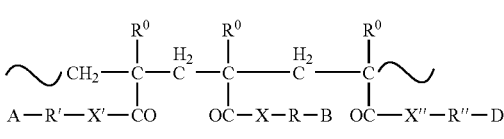

R is
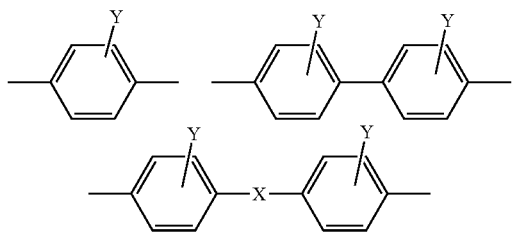
$(CH_2)_3$, or $(CH_2)_6$
X, X', X" are NH or O.
Y is H, $CH_3$, $CH_3O$, COOM, or $SO_3M$.
M is a cation.
$R^o$ is H or $CH_3$.
A, B, D is one of the following a, b, c, d, e, or f.
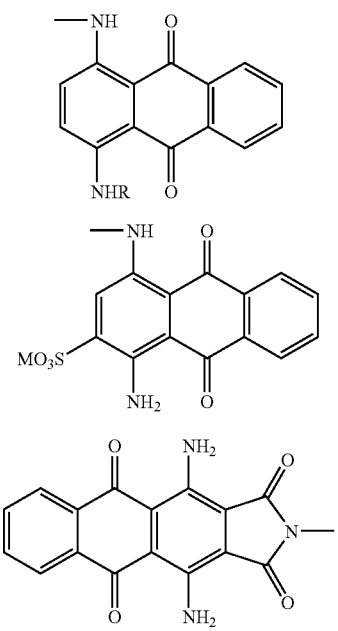
a
b
c
-continued
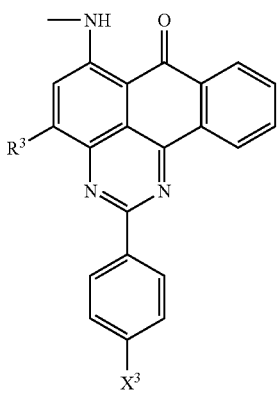
d
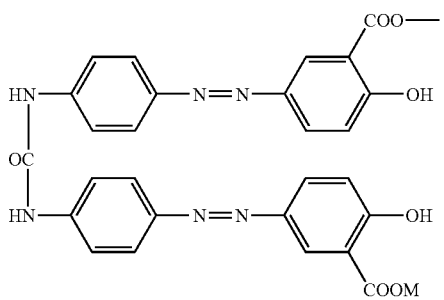
e
f
$R^3$ is H, Br, or $SO_3M$.
$X^3$ is H or $SO_3M$.
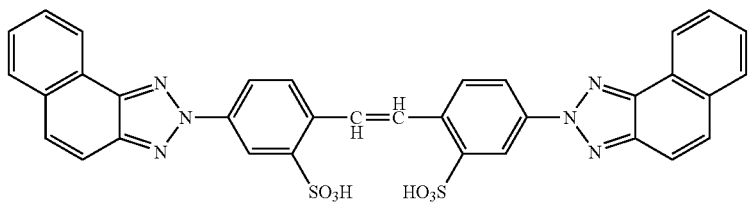
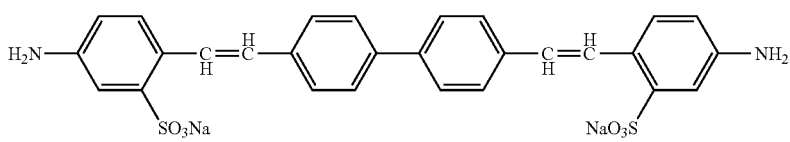

-continued

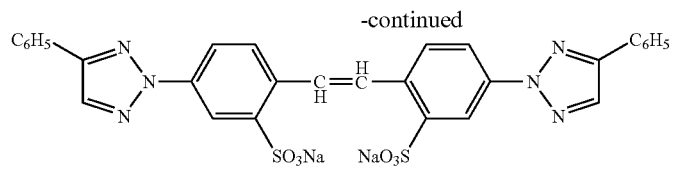

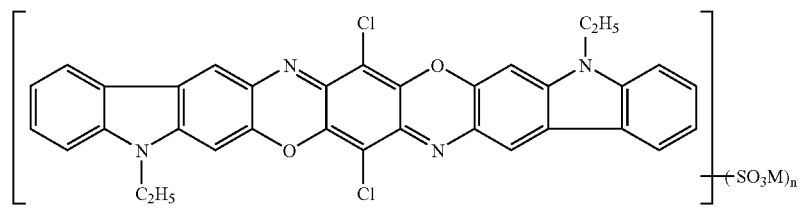

n is an integer from 2 to 4.
M is a cation.

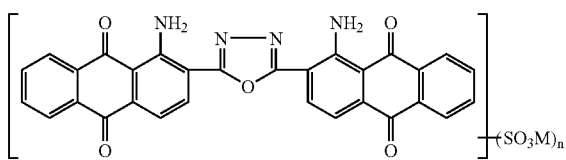

n is 2.
M is a cation.

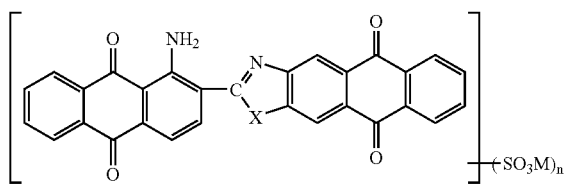

n is 2 or 3.
M is a cation.

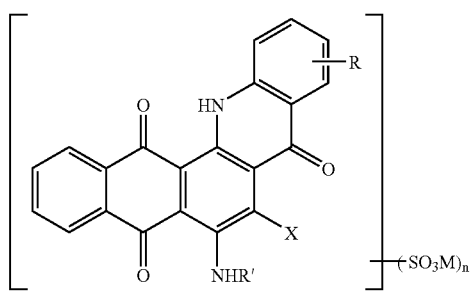

n is 2.
M is a cation.
R, R' are H, Cl, an alkyl group, or an alkoxy group.

It is preferable that the alkyl group in each of the chemical formula has 1 to 4 carbon atom. Moreover, the halogen in each of the chemical formula is preferably Cl or Br. Furthermore, as the cation in each of the chemical formula, H+, Li+, Na+, K+, Cs+ or $NH_4$+ can be presented.

In the present invention, among the substances, the substances represented by the chemical formulae I to V can be used preferably. Moreover, the substances can be used either alone by one kind or as a combination of two or more kinds.

Furthermore, as the material containing the plate-like molecules having the photo dichroism in the visible light range to show the lyotropic liquid crystal phase in an aqueous solution, for example, "N015" produced by Optiva, Inc. or the like can be presented.

Moreover, the plate-like molecules are not limited to those showing the lyotropic liquid crystal phase as mentioned above but also those showing the thermotropic liquid crystal phase may be used as well.

(Resin Layer)

Since the column structure is formed along the concave part of the resin layer having a concave part or a convex part with a predetermined width in the surface in a pattern, the column structure can be aligned in a certain direction. The pattern shape of the concave part or the convex part is not particularly limited as long as the plate-like molecules can form the column structure. In particular, it is preferably a pattern with the concave part or the convex part formed regularly by a certain interval as stripes.

The width of the concave part differs depending upon the kind of the plate-like molecules to be used, or the like. It is in general in a range of 0.1 μm to 10 μm, preferably in a range of 0.2 μm to 1 μm, and particularly preferably in a range of 0.2 μm to 0.4 μm. It is difficult to form the concave part width narrower than the range mentioned above in terms of the production method, and on the contrary, it may be difficult to align the column structure if the concave part width is too wide.

Moreover, the depth of the concave part is in a range of 0.05 μm to 1 μm, particularly preferably in a range of 0.1 μm to 0.2 μm. In the case the depth of the concave part is too shallow the function of alignment, the plate-like molecules comprising the column structure is deteriorated, and in the case the concave part is too deep, an adverse effect can be cast on the alignment of the ferroelectric liquid crystal.

Here, the interval at the time of forming the concave part as the stripes differs depending on the kind of the plate-like molecules to be used, or the like. It is in general the interval between the ends of the adjacent concave parts, that is, the width of the convex part is half or less of the visible light wavelength, preferably in a range of 0.05 μm to 2 μm, more preferably in a range of 0.1 μm to 1 μm, and particularly preferably in a range of 0.1 μm to 0.2 μm. It is difficult to form the interval between the adjacent concave parts narrowly in terms of the production method, and it may be difficult to align the column structure if it is too wide. Moreover, if the interval between the adjacent concave parts is a value close to the wavelength of the light beam, optical problems such as coloring can be involved due to the diffraction of the light beam.

Moreover, the pitch of the concave parts can be selected optionally according to the kind of the plate-like molecules to be described later, or the like. It is in general in a range of 0.1 μm to 10 μm, preferably in a range of 0.2 μm to 1 μm, and particularly preferably in a range of 0.2 μm to 0.4 μm. It is difficult to form the interval between the adjacent concave parts narrowly in terms of the production method, and it may be difficult to align the column structure if it is too wide. Here, the "pitch of the concave parts" refers to the distance from the center to the center of the adjacent concave parts.

The cross-sectional shape of the concave part of the resin layer is not particularly limited, and it may be rectangular, trapezoid, or other shapes. In the present invention, it is particularly preferable that the cross-sectional shape of the concave part is rectangular because the column structure can easily be oriented and aligned in a certain direction.

Such a resin layer having the concave part or the convex part can be formed by for example preparing a concave part forming substrate having a convex part symmetrical to the shape of the targeted concave part on the surface and a concave part forming base material for forming the resin layer by interposing a hardening resin composition with respect to the concave part forming substrate and hardening the same, laminating the concave part forming substrate and the concave part forming base material with the hardening resin composition coated thereon so as to interpose the hardening resin composition, hardening the hardening resin composition, and removing the concave part forming substrate.

As the hardening resin used for the hardening resin composition, for example, hardening resins such as an unsaturated polyester, a melamine, an epoxy, a polyester (meth) acrylate, a urethane (meth)acrylate, an epoxy (meth)acrylate, a polyether (meth)acrylate, a polyol (meth)acrylate, a melamine (meth) acrylate, and a triazine based acrylate can be used alone or as a mixture. Moreover, the resin composition may either be a thermosetting resin or a ultraviolet ray curable resin, or a combination thereof.

Moreover, as needed, various kinds of additives such as a hardening agent and a photo polymerization initiating agent may be added to the resin composition. Moreover, the viscosity thereof may be adjusted using a solvent, a monomer, or the like for the application onto the concave part forming base material.

Moreover, as to the film thickness of the resin layer, in general, the thickness of the portion with the concave part formed is 1 μm or less, and it is preferably 0.2 μm or less. In the case the thickness of the portion with the concave part formed is too thick, the liquid crystal display of the present invention may be thick and heavy. Moreover, in consideration to realize the thin shape of the liquid crystal display, the thickness of the portion with the concave part formed is preferably thin, however, since it is difficult to form a product too thin, the thickness of the portion with the concave part formed is in general 0.1 μm or more.

Here, in the present invention, in the case of copying such a rugged structure, in general, the formed resin layer surface may have a high water repellency, however, since the columnar alignment layer forming coating solution is to be coated onto the resin layer, it is preferable that the resin layer is hydrophilic. Therefore, a hydrophilic layer may be provided onto the resin layer, or the hydrophilic process may be applied to the resin layer surface. As a method of the surface treatment for the resin layer surface to make it lyophilic, a lyophilic surface treatment by the plasma process utilizing an argon, water, or the like can be presented. Moreover, as the lyophilic layer to be formed onto the resin layer, for example a silica film formed by the sol gel process of a tetraethoxy silane, or the like can be presented.

(Columnar Alignment Layer)

The thickness of the columnar alignment layer used in the present invention differs depending on the characteristics required to the liquid crystal display, and moreover, it also differs in the case the columnar alignment layer is a single layer having the column structure and in the case it has the column structure and the resin layer. For example, in the case the columnar alignment layer is a single layer having the column structure, the thickness of the columnar alignment layer in general is preferably in a range of 50 nm to 2,000 nm, more preferably in a range of 100 nm to 1,000 nm, and further preferably in a range of 200 nm to 500 nm. In the case the thickness of the columnar alignment layer is too thin, the alignment of the ferroelectric liquid crystal may not be controlled sufficiently. On the other hand, in the case it is too thick, the alignment disturbance may be generated in the vicinity of the surface, and thus it is not preferable also in terms of the cost.

Moreover, the transmission of the columnar alignment layer is preferably 20% or more in the entire region, and it is more preferably 30% or more. The above-mentioned transmission can be measured by a spectrophotometer for ultraviolet and visible region.

Such a columnar alignment layer can be formed on the substrate in a state with the column structure maintained by forming a column structure comprising the plate-like molecules in a columnar alignment layer forming coating solution prepared by adding the plate-like molecules in a solvent, and coating the coating solution.

The above-mentioned columnar alignment layer forming coating solution may contain a liquid crystal material in addition to the plate-like molecules. For example, even in the case the plate-like molecules car hardly form the column structure, by aligning the liquid crystal material, the plate-like molecules can be aligned along the alignment direction of the liquid crystal material. As such a liquid crystal material, a liquid crystal material commonly used for forming a polarizing layer can be used. Moreover, the liquid crystal composition containing the liquid crystal material and the plate-like molecules may show either the lyotropic liquid crystal phase or the thermotropic liquid crystal phase. In general, one showing the thermotropic liquid crystal is used.

The solvent used for the columnar alignment layer forming coating solution can be selected optionally according to the substituent introduced to the plate-like molecules. For example, in the case a hydrophilic group such as a sulfonic acid group is introduced, water is used as the solvent. On the other hand, in the case a hydrophobic group such as a long chain alkyl group is introduced, an organic solvent is used. The organic solvent may as needed contain various kinds of the additives such as a surfactant including a polyethylene glycol. Among the ones mentioned above, according to the present invention, the columnar alignment layer forming coating solution is preferably water based because the fixing process to be described after can be facilitated thereby.

The coating method for the columnar alignment layer forming coating solution is not particularly limited as long as the normal directions of the plate-like molecules can be aligned in a certain direction. For example, various coating methods such as Mayer bar coating, gravure coating, die coating, dip coating and spray coating, the screen printing method, the ink jet method, or the like can be used. The coating method can be determined optionally depending on either the column structure is formed on a plane or on the rugged surface as the resin layer.

For example, in the case the column structure is formed on a plane, it is preferable to select the coating method capable of applying the shearing stress out of the methods. By using the coating method capable of applying the shearing stress, the column structure formation can be facilitated.

As the coating methods capable of applying the shearing stress, for example, Mayer bar coating, slot die coating and slide coating can be presented. In particular, it is preferable to use slot die coating.

On the other hand, in the case the column structure is formed on the rugged surface as the resin layer, it is preferable to use a coating method without applying the shearing stress so as to form the column structure along the rugged shape on the resin layer. In this case, as the coating method, the ink jet method, spray coating, dip coating and the flexo printing method can be used preferably. In particular, the ink jet method is preferable.

After coating the columnar alignment layer forming coating solution, the solvent contained in the coating film is evaporated for drying the coating film. As the drying method, the methods commonly used for drying the solvent, such as heat drying, room temperature drying, freeze drying, far infrared ray drying, or the like can be used.

After the drying operation, it is preferable to carry out the fixing process for fixing the alignment state of the plate-like molecules. For example, in the case the plate-like molecules to be used have a hydrophilic group, by carrying out the hydrophobic process, the column structure can be stabilized and the water resistance can be provided to the columnar alignment layer. The hydrophobic process solution used for the hydrophobic process is not particularly limited as long as it can process the hydrophilic group so as to be insoluble or poor soluble to water by for example cross-linking, and it differs depending on the hydrophilic group of the plate-like molecules to be used. Specifically, an aqueous solution of an alkaline earth metal salt such as a barium salt, a calcium salt and a magnesium salt can be used, and a barium chloride aqueous solution, a magnesium chloride aqueous solution, a calcium chloride aqueous solution, or the like can be presented. For example, in the case the plate-like molecules have a $SO_3NH_4$ group, by coupling the sulfonic acid ion of the $SO_3NH_4$ group and the barium ion, the adjacent plate-like molecules can be cross-linked so as to fix the column structure.

The hydrophobic process method is not particularly limited as long as it is a method capable of processing the hydrophilic group so as to be hydrophobic, and a method for coating the hydrophobic process solution after coating the columnar alignment layer forming coating solution and drying, a method for soaking into the hydrophobic process solution, or the like can be presented. By washing and drying after coating or soaking in the hydrophobic process solution, the columnar alignment layer can be obtained.

On the other hand, in the case the plate-like molecules have a hydrophobic group such as a long chain alkyl group, by introducing a polymerizable group in the core portion of the plate-like molecules or a part of the alkyl side chain and polymerizing the polymerizable group, the plate-like molecules can be cross-linked linearly or like a mesh so as to fix the column structure.

Furthermore, in the case the columnar alignment layer forming coating solution contains a liquid crystal material, the alignment state of the plate-like molecules can also be fixed by polymerizing the liquid crystal material. In this case, the liquid crystal material needs to have a polymerizable group.

Accordingly, in the present invention, since the columnar alignment layer can be formed only by coating the columnar alignment layer forming coating solution and carrying out a simple post treatment, it is highly practical without the need of much production cost.

b. First Base Material

The first base material used in the present invention is not particularly limited as long as it is one commonly used as the base material for the liquid crystal display. For example, a glass plate, a plastic plate, or the like can be presented preferably. The surface roughness (RSM value) of the base material used in the present invention is preferably 10 nm or less, it is more preferably 3 nm or less, and it is further preferably in a range of 1 nm or less. The above-mentioned surface roughness is the value measured using an atomic force microscope (AFM).

c. First Electrode Layer

The first electrode layer used in the present invention is for driving the ferroelectric liquid crystal by applying a signal voltage to the ferroelectric liquid crystal.

The first electrode layer is not particularly limited as long as it is one commonly used as the electrode layer of the liquid crystal display, and it is preferable that at least one of the first electrode layer and the second electrode layer is made of a transparent conductive material. As the transparent conductive material, an indium oxide, a tin oxide, an indium tin oxide (ITO), or the like can be presented preferably.

For example, in the case the liquid crystal display of the present invention is of the active matrix drive using the TFT elements, it is preferable that one of the first electrode layer and the second electrode layer is an entire surface common electrode made of the transparent conductive material and the other one comprises the x electrodes and the y electrodes arranged in a matrix so as to dispose the TFT element and the pixel electrode in the portions surrounded by the x electrodes and the y electrodes.

Out of these electrodes, the transparent conductive film to provide the entire surface common electrode can be formed on the substrate by the deposition method such as the CVD method, the sputtering method and the ion plating method. Moreover, the x electrodes and the y electrodes can be formed by forming a conductive film of a metal such as a chromium and an aluminum by the deposition method and patterning the same into a matrix. As the patterning method, a common method such as the photolithography method can be used.

(2) Second Alignment Substrate

Next, the second alignment substrate used in the present invention will be explained. In the present invention, the second alignment substrate comprises a second base material, a second electrode layer formed on the second base material, and a second alignment layer formed on the second electrode layer. Hereinafter, each constituent member of the second alignment substrate will be explained, however, since the second base material and the second electrode layer are same as those explained in the column for the first alignment substrate, explanation is omitted here.

a. Second Alignment Layer.

First, the second alignment layer will be explained. The second alignment layer used in the present invention is not particularly limited as long as it has the alignment function of aligning the ferroelectric liquid crystal. For example, a photo alignment layer, an alignment layer by the rubbing alignment layer, or the like can be presented. In the present invention, among the alignment layer, it is preferable to use a photo alignment layer because the photo alignment layer enables the quantitative alignment process without the problems of the static electricity, the dusts, or the like. The "photo alignment layer" here is a layer produced by the light irradiation to a substrate with the constituent materials for the photo alignment layer to be described later coated so as to generate the photo excitation reaction for providing the anisotropy. According to the anisotropy, the alignment function for controlling the alignment of the liquid crystal molecules can be provided.

The constituent materials for the photo alignment layer used in the present invention are not particularly limited as long as it has the effect of aligning the ferroelectric liquid crystal by generating the photoexcitation. The wavelength range of the light beam for generating the excitation reaction is preferably in a range of the ultraviolet ray range, that is, in a range of 10 nm to 400 nm, and it is more preferably in a range of 250 nm to 380 nm.

Such materials can be classified roughly into the photo isomerization type materials for providing the anisotropy to the photo alignment layer by generating the photoreaction, and the photo isomerizable materials for providing the anisotropy to the photo alignment layer by generating the photo isomerization reaction. Hereinafter, each of them will be explained.

(Photoreaction Type)

Further, the photoreaction type material will be explained. As mentioned above, the photoreaction type material is a material for providing the anisotropy to the photo alignment layer by generating the photoreaction. The photoreaction type material used in the present invention is not particularly limited as long as it is a material having such characteristics. It is more preferably a material for providing the anisotropy to the photo alignment layer by generating the photo dimerization reaction or the photo decomposition reaction.

The photo dimerization reaction mentioned here is a reaction that two molecules are polymerized by radical polymerization of their reactive sites aligned in the direction of polarization through the irradiation with light. This reaction makes it possible to stabilize the alignment in the polarization direction to give anisotropy to the photo alignment layer. On the other hand, the photo decomposition reaction is a reaction which decomposes a molecule chain of polyimide or the like which is aligned in the direction of polarization by the irradiation with light. This reaction makes it possible to give anisotropy to the photo alignment layer in the state that the molecule chain aligned in the direction perpendicular to the polarization direction remains. In the present invention, among these materials, it is preferable to use a material utilizing the photo dimerization reaction because the material utilizing the photo dimerization reaction has a high exposure sensitivity so as to provide a wide material selection range.

The photoreactive material using such photo dimerization reaction is not limited to any especial kind if the material can give anisotropy to the photo alignment layer by photo dimerization reaction. The material preferably comprises an photo dimerization-reactive compound having a radical-polymerizable functional group and dichroism that different absorptivities are exhibited in accordance with the polarization direction thereof since the alignment of the photo dimerization-reactive compound is stabilized and anisotropy can easily be given to the photo alignment layer by radical-polymerizing its reactive sites aligned in the polarization direction.

Examples of the photo dimerization-reactive compound include dimerization-reactive polymers each having, as its side chain, at least one reactive site selected from cinnamic acid ester, coumalin, quinoline, and a chalcone group.

Of these, the following is preferred as the photo dimerization-reactive compound having such properties: a dimerization-reactive polymer having, as its side chain, any one of cinnamic acid ester, coumalin and quinoline. This is because the compound is radical-polymerized in the state that the double bonds in the α,β-unsaturated ketone aligned in the polarization direction function as reactive sites, whereby anisotropy can easily be given to the photo alignment layer.

The main chain of the dimerization-reactive polymer is not limited to any especial kind if the main chain is a chain that is generally known as a polymer main chain, and is preferably a chain which does not have a substituent containing many π electrons, which hinder interactions between the reactive sites of the above-mentioned side chain, an example of the substituent being an aromatic hydrocarbon group.

The weight-average molecular weight of the dimerization-reactive polymer is not especially limited, and is preferably from 5,000 to 40,000, more preferably from 10,000 to 20,000. The weight-average molecular weight can be measured by gel permeation chromatography (GPC). If the weight-average molecular weight of the dimerization-reactive polymer is too small, an appropriate anisotropy may not be given to the photo alignment layer. Conversely, if it is too large, the viscosity of the coating solution at the time of the formation of the photo alignment layer is so high that a homogeneous coat layer may not easily be formed.

As the dimerization-reactive polymer, a compound represented by the following formula can be illustrated:

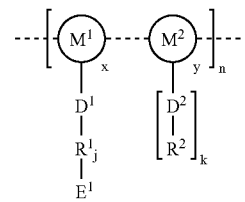

In the above formula, $M^1$ and $M^2$ each independently represent a monomer unit of a homopolymer or a copolymer. Examples thereof include ethylene, acrylate, methacrylate, 2-chloroacrylate, acrylamide, methacrylamide, 2-chloroacrylamide, styrene derivatives, maleic acid derivatives, and siloxane. $M^2$ may be acrylonitrile, methacrylonitrile, methacrylate, methyl methacrylate, hydroxyalkyl acrylate or hydroxyalkyl methacrylate. x and y each represent the mole ratio of each of the monomer units when the units are polymerized into a copolymer, and are each a number satisfying: $0<x\leq1$, $0\leq y<1$, and $x+y=1$. n represents an integer of 4 to 30,000. $D^1$ and $D^2$ each represent a spacer unit.

$R^1$ is a group represented by $-A-(Z^1-B)_z-Z^2-$, and $R^2$ is a group represented by $-A-(Z^1-B)_z-Z^3-$, wherein A and B each independently represent a covalent single bond, pyridine-2,5-diyl, pyrimidine-2,5-diyl, 1,4-cyclohexylene, 1,3-dioxane-2,5-diyl, or 1,4-phenylene which may have a substituent; $Z^1$ and $Z^2$ each independently represent a covalent single bond, —CH$_2$—CH$_2$—, —CH$_2$O—, —OCH$_2$—, —CONR—, —RNCO—, —COO— or —OOC—, wherein R is a hydrogen atom or a lower alkyl group; $Z^3$ is a hydrogen atom, an alkyl or alkoxy which has 1 to 12 carbon atoms and may have a substituent, cyano, nitro or halogen; z is an integer of 0 to 4; $E^1$ represents an photo dimerization-reactive site, examples of which include cinnamic acid ester, coumalin, quinoline, and a chalcone group; and j and k are each independently 0 or 1.

More preferable examples of this dimerization-reactive polymer include compounds represented by the following formulae:

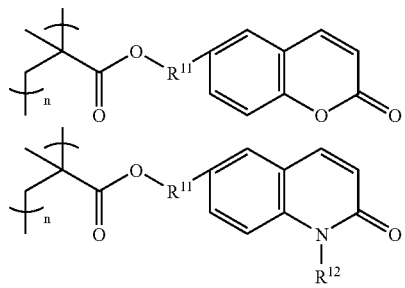

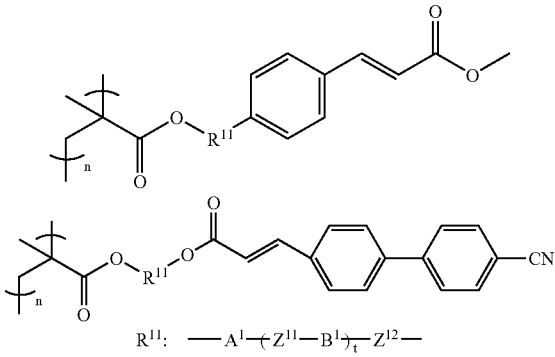

$R^{11}$: —A$^1$—(Z$^{11}$—B$^1$)$_t$—Z$^{12}$— wherein $A^1$ and $B^1$: 1,4-phenylene, a covalent single bond, pyridine-2,5-diyl, pyrimidine-2,5-diyl, 1,4-cyclohexylene or 1,3-dioxane-2,5-diyl;

$Z^{11}$ and $Z^{12}$: —CH$_2$—CH$_2$—, —COO—, —OOC—, or a covalent single bond; and t: an integer of 0 to 4.

$R^{12}$: a lower alkyl n: an integer of 4 to 30,000

Of the above-mentioned dimerization-reactive polymers, particularly preferable is at least one of compounds 1 to 4 represented by the following formulae:

1

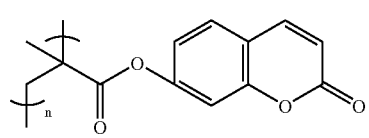

2

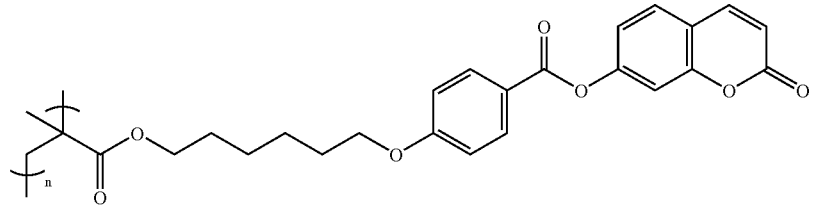

3

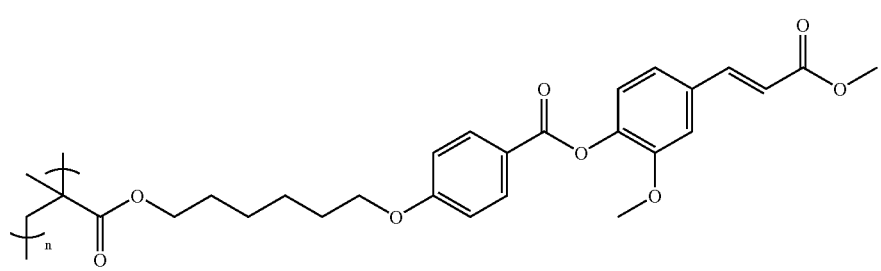

4

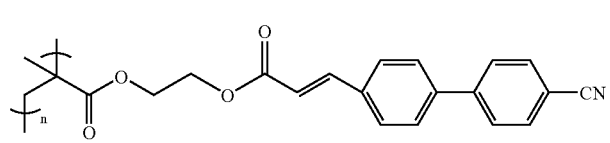

In the present invention, a photo dimerization-reactive site or substituent can be variously selected as the photo dimerization-reactive compound from the above-mentioned compounds in accordance with required properties. One kind of the photo dimerization-reactive compound may be used alone or a combination of two or more kinds can be used.

The photoreactive material using photo dimerization reaction may contain additives besides the above-mentioned photo dimerization-reactive compound as long as the photo-aligning of the photo alignment layer is not hindered. Examples of the additives include a polymerization initiator and a polymerization inhibitor.

It is advisable to select the polymerization initiator or the polymerization inhibitor appropriately from generally-known compounds in accordance with the kind of the photo dimerization-reactive compound and then use the selected one. The added amount of the polymerization initiator or the polymerization inhibitor is preferably from 0.001% by weight to 20% by weight, more preferably from 0.1% by weight to 5% by weight of the photo dimerization-reactive compound.

Examples of the photoreactive material using the photo decomposition reaction include a polyimide "RN1199" manufactured by NISSAN CHEMICAL INDUSTRIES, LTD. Moreover, as the photoreaction type material utilizing the photo dimerization reaction, for example, "ROP102" or "ROP103" produced by the Rolic Technologies Ltd., or the like can be presented.

Next, the manufacturing method of a photo alignment layer in the case of using the photoreaction type material will be explained. In the present invention, the manufacturing method of a photo alignment layer is not particularly limited as long as the anisotropy can be provided to the photo alignment layer. For example, the photo alignment layer can be formed by coating a coating solution prepared by diluting the constituent materials for the photo alignment layer in an organic solvent onto the surface facing a liquid crystal layer of a substrate provided with an electrode layer, drying and applying the photo alignment process to the obtained film.

In this case, the content of the photo dimerization-reactive compound in the coating solution is preferably from 0.05% by weight to 10% by weight, more preferably from 0.2% by weight to 2% by weight. If the content of photo dimerization-reactive compound is too small, an appropriate anisotropy is not easily given to the photo alignment layer. Conversely, if the content is too large, the viscosity of the coating solution becomes so high that a homogeneous coat layer is not easily formed.

The coating method which can be used is spin coating, roll coating, rod bar coating, spray coating, air knife coating, slot die coating, wire bar coating or the like.

The thickness of the polymer film obtained by the coating with the constituent material is preferably from 1 nm to 200 nm, more preferably from 3 nm to 100 nm. If the thickness of the polymer film is too small, a sufficient photoaligning may not be obtained. Conversely, if the thickness is too large, the alignment of the liquid crystal molecules may be disturbed and further costs therefor are not preferred.

The obtained polymer film causes photo-excited reaction by the irradiation with light the polarization of which is controlled, whereby anisotropy can be given. The wavelength range of the radiated light should be appropriately selected in accordance with the constituent material of the used photo alignment layer, and is preferably the range of ultraviolet ray wavelengths, that is, the range of 100 to 400 nm, more preferably the range of 250 nm to 380 nm.

The polarizing direction is not particularly limited as long as the photo-excited reaction can be generated, and it is preferably substantially perpendicular to the substrate surface because the alignment state of the ferroelectric liquid crystal can be provided preferably.

(Photo Isomerization Type)

Next, the photo isomerization type material will be explained. In the present invention, the "photo isomerization type material" is a material for providing the anisotropy to the photo alignment layer by generating the photo isomerization reaction as mentioned above, and it is not particularly limited as long as it is a material having the characteristics. It is more preferably one containing a photo isomerization-reactive compound for providing the anisotropy to the photo alignment layer by generating the photo isomerization reaction. Since such a photo isomerization-reactive compound is included, the stable isomers are increased out of a plurality of isomers, and thereby the anisotropy can be provided to the photo alignment layer.

Such photo isomerization-reactive compound is not limited to any especial kind if the compound is a material having the above-mentioned properties, and is preferably a compound which has dichroism that different absorptivities are exhibited in accordance with the polarization direction thereof and generates photo isomerization reaction by the irradiation with light. By generating the isomerization of the reactive site aligned in the polarization direction of the photo isomerization-reactive compound having such properties, anisotropy can easily be given to the photo alignment layer.

For the photo isomerization reaction generating such photo isomerization-reactive compound, the photo isomerization reaction is preferably the cis-trans isomerization reaction since any one of the cis-isomer and the trans-isomer increases by the irradiation with light, whereby anisotropy can be given to the photo alignment layer.

Examples of such photo isomerization-reactive compound may be monomolecular compounds or polymerizable monomers polymerizable with light or heat. These should be appropriately selected in accordance with the kind of the used ferroelectric liquid crystal. It is preferable to use any one of the polymerizable monomers since the monomer gives anisotropy to the photo alignment layer by the irradiation with light and subsequently the monomer is polymerized, whereby the anisotropy can be made stable. Of such polymerizable monomers, preferable is an acrylate monomer or methacrylate monomer since the monomer gives anisotropy to the photo alignment layer and subsequently the monomer can easily be polymerized in the state that the anisotropy is kept good.

The polymerizable monomer may be a monofunctional monomer or a polyfunctional monomer. A bifunctional monomer is preferable since the anisotropy of the photo alignment layer, based on the polymerization, becomes more stable.

Specific examples of such a photo isomerization-reactive compound include compounds having a cis-trans isomerization-reactive skeleton, such as an azobenzene skeleton or a stilbene skeleton.

In this case, the number of the cis-trans isomerization-reactive skeleton(s) may be one or more, and is preferably two since the alignment of the ferroelectric liquid crystal is easily controlled.

The cis-trans isomerization-reactive skeleton(s) may have a substituent in order to make interaction with the liquid crystal molecules higher. The substituent is not limited to any especial kind if the substituent can make the interaction with the liquid crystal molecules high and further does not hinder the alignment of the cis-trans isomerization-reactive skeleton(s). Examples include a carboxyl group, a sodium sulfonate group, and a hydroxyl group. These skeleton structures can be appropriately selected in accordance with the kind of the used ferroelectric liquid crystal.

The photo isomerization-reactive compound may have a group containing many π electrons in the molecule, such as an aromatic hydrocarbon group, besides the cis-trans isomerization-reactive skeleton in order to make the interaction with the liquid crystal molecules higher. The cis-trans isomerization- The side chain of the polymerizable monomer may have, as a spacer, an aliphatic hydrocarbon group such as an alkylene group so that the cis-trans isomerization-reactive skeleton can easily be aligned.

Of the above-mentioned photo isomerization-reactive compounds of monomolecular compounds and polymerizable monomers as described above, any compound having in the molecule thereof an azobenzene skeleton is preferable as the photo isomerization-reactive compound used in the present invention. This is because the azobenzene skeleton interacts highly with the liquid crystal molecules and is particularly suitable for the control of the alignment of the ferroelectric liquid crystal since the skeleton contains many π electrons.

Hereinafter, the reason why the anisotropy can be provided to the photo alignment layer by generating the photo isomerization reaction of the azobenzene skeleton will be explained. First, in the case a linear polarization ultraviolet ray is directed to the azobenzene skeleton, the azobenzene skeleton of the trans isomer, with the molecule longer axis aligned in the polarization direction is changed to acid isomer as shown by the below-mentioned formula.

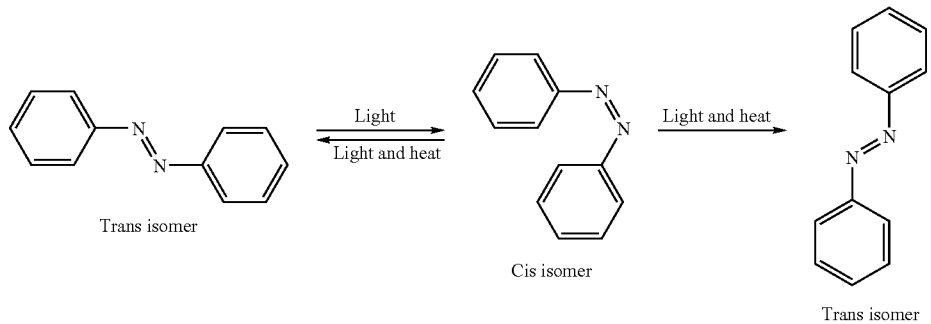

reactive skeleton and the aromatic hydrocarbon group may be bonded to each other through a bonding group. The bonding group is not limited to any especial kind if the group can make the interaction with the liquid crystal molecules high. Examples include —COO—, —OCO—, —O—, —C≡C—, —CH$_2$—CH$_2$—, —CH$_2$O—, and —OCH$_2$—.

In the case of using a polymerizable monomer as the photo isomerization-reactive compound, it is preferable that the monomer has, as its side chain, the above-mentioned cis-trans isomerization-reactive skeleton. When the monomer has, as its side chain, the cis-trans isomerization-reactive skeleton, the advantageous effect of the anisotropy given to the photo alignment layer becomes larger and this compound becomes particularly suitable for the control of the alignment of the ferroelectric liquid crystal. In this case, it is preferable that the above-mentioned aromatic hydrocarbon group and the bonding group contained in the molecule are contained, together with the cis-trans isomerization-reactive skeleton, in the side chain so as to make the interaction with the liquid crystal molecules high.

Since the cis isomer of the azobenzene skeleton is more chemically unstable than trans isomers thereof, the cis isomer returns thermally to any one of the trans isomers or absorbs visible rays to returns thereto. At this time, it happens with the same possibility whether the cis isomer turns to the trans isomer at the left side or the trans isomer at the right side in the formula. Accordingly, when the azobenzene skeleton continues to absorb ultraviolet rays, the ratio of the trans isomer at the right side increases so that the average alignment direction of the azobenzene skeleton becomes perpendicular to the polarized ultraviolet ray direction. In the present invention, this phenomenon is used to make polarization directions of skeletons of azobenzene consistent with each other, thereby giving anisotropy to the photo alignment layer to control the alignment of liquid crystal molecules on the layer.

An example of such monomolecular compound out of the compounds each having in the molecule an azobenzene skeleton used in the present invention may be a compound represented by the following formula:

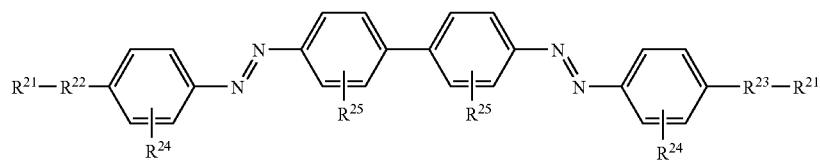

wherein $R^{21}$s each independently represent a hydroxy group; $R^{22}$ represents a linking group represented by —$(A^{21}$—$B^{21}$—$A^{21})_m$—$(D^{21})_n$— and $R^{23}$ represents a linking group represented by $(D^{21})_n$—$(A^{21}$—$B^{21}$—$A^{21})_m$—, wherein $A^{21}$ represents a bivalent hydrocarbon group, $B^{21}$ represents —O—, —COO—, —OCO—, —CONH—, —NHCO—, —NHCOO— or —OCONH—, m represents an integer of 0 to 3, $D^{21}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; $R^{24}$s each independently represent a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and $R^{25}$s each independently represent a carboxy group, a sulfo group, a nitro group, an amino group or a hydroxy group provided that the carboxy group or the sulfo group may be combined with an alkali metal to form a salt.

Specific examples of the compound represented by the above-mentioned formula include the following compounds:

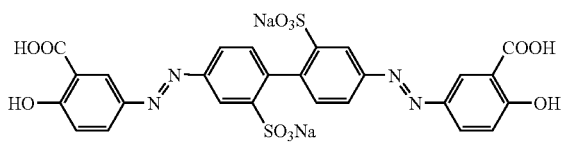

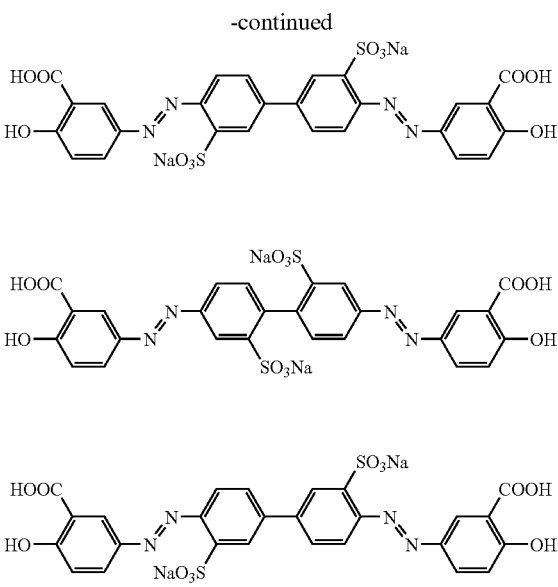

An example of the polymerizable monomer having in its side chain an azobenzene skeleton used in the present invention may be a compound represented by the following formula:

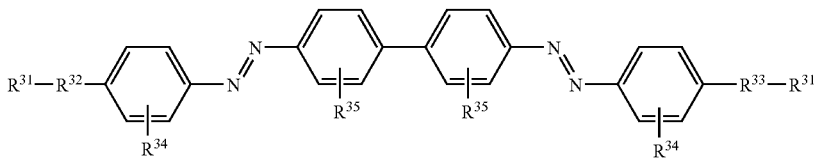

wherein $R^{31}$s each independently represent a (meth)acryloyloxy group, a (meth)acrylamide group, a vinyloxy group, a vinyloxycarbonyl group, a vinyliminocarbonyl group, a vinyliminocarbonyloxy group, a vinyl group, an isopropenyloxy group, an isopropenyloxycarbonyl group, an isopropenyliminocarbonyl group, an isopropenyliminocarbonyloxy group, an isopropenyl group or an epoxy group; $R^{32}$ represents a linking group represented by —$(A^{31}$—$B^{31}$—$A^{31})_m$—$(D^{31})_n$— and $R^{33}$ represents a linking group represented by $(D^{31})_n$—$(A^{31}$—$B^{31}$—$A^{31})_m$— wherein $A^{31}$ represents a bivalent hydrocarbon group, $B^{31}$ represents —O—, —COO—, —OCO—, —CONH—, —NHCO—, —NHCOO— or —OCONH—, m represents an integer of 0 to 3, $D^{31}$ represents a bivalent hydrocarbon group when m is 0 and represents —O—, —COO—, —OCO—, —CONH—, —NHCO—, —NHCOO— or —OCONH— when m is an integer of 1 to 3, and n represents 0 or 1; $R^{34}$s each independently represent a halogen atom, a carboxy group, a halogenated methyl group, a halogenated methoxy group, a cyano group, a nitro group, a methoxy group, or a methoxycarbonyl group provided that the carboxy group may be combined with an alkali metal to form a salt; and $R^{35}$s each independently represent a carboxy group, a sulfo group, a nitro group, an amino group or a hydroxy group provided that the carboxy group or the sulfo group may be combined with an alkali metal to form a salt.

A specific example of the compound represented by the above-mentioned formula is the following compound:

The photo alignment layer in the case of using such a photo isomerization type material can be formed by the same method as in the case of using the photoreaction type material. In this case, the content of the photo isomerization-reactive compound in the coating solution is preferably in a range of 0.05% by weight to 10% by weight, and it is more preferably in a range of 0.2% by weight to 5% by weight.

In the case of using the photo isomerization type, the photo alignment process can also be conducted by radiating oblique non-polarized ultraviolet rays. The direction of the radiation of the light is not especially limited if the direction makes it possible to generate the photo-excited reaction, and is pref-

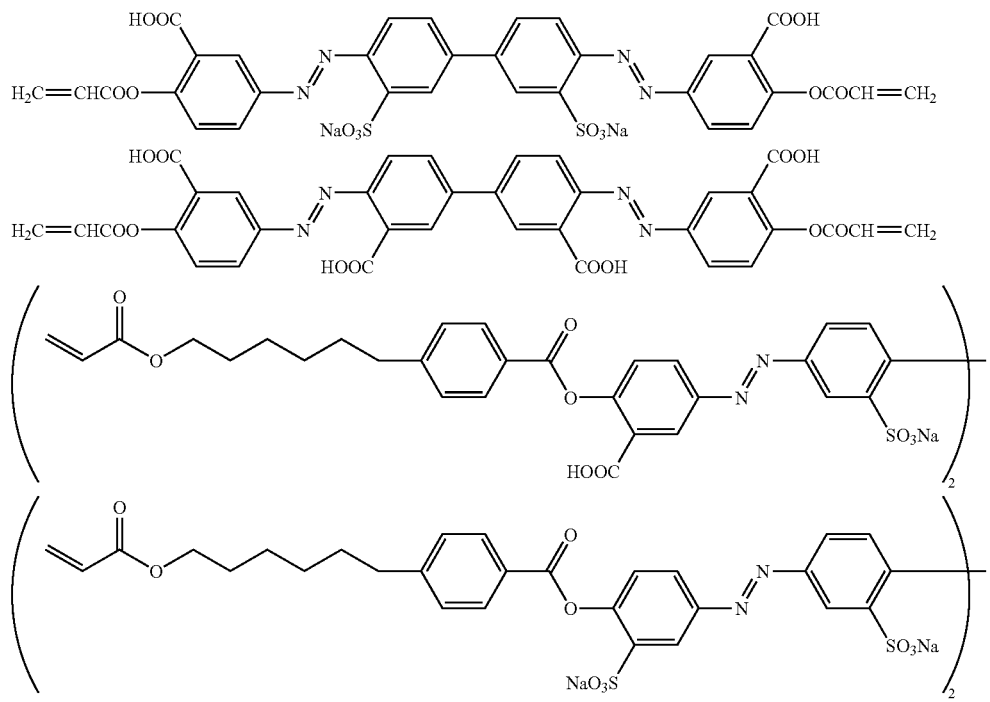

In the present invention, the cis-trans isomerization-reactive skeleton or substituent can be variously selected from the above-mentioned photo isomerization-reactive compounds in accordance with required properties. One kind of the photo isomerization-reactive compound may be used alone or a combination of two or more kinds can be used.

Additives, besides the above-mentioned photo isomerization-reactive compound, may be contained as the photo isomerization type material used in the present invention as long as the photoaligning of the photo alignment layer is not hindered. In the case of using a polymerizable monomer as the photo isomerization-reactive compound, examples of the additives include a polymerization initiator and a polymerization inhibitor.

It is advisable to select the polymerization initiator or the polymerization inhibitor appropriately from generally-known compounds in accordance with the kind of the photo isomerization-reactive compound and then use the selected one. The added amount of the polymerization initiator or the polymerization inhibitor is preferably from 0.001% by weight to 20% by weight, more preferably from 0.1% by weight to 5% by weight of the photo isomerization-reactive compound.

erably in the range of 10° to 45° oblique to the substrate face, more preferably in the range of 30° to 45° oblique thereto, and most preferably 45° oblique thereto since the alignment state of the ferroelectric liquid crystal can be made good.

Furthermore, in the case of using a polymerizable monomer as described above as the photo isomerization-reactive compound used, the photo alignment process is conducted, and then the monomer is heated, thereby polymerizing the monomer. In this way, the anisotropy given to the photo alignment layer can be made stable.

b. Polarizing Plate

As mentioned above, a polarizing plate is used for the second alignment substrate. The polarizing plate is disposed such that the polarization direction is perpendicular to the normal directions of the plate-like molecules comprising the columnar alignment layer of the first alignment substrate. The polarizing plate is not limited to any especial kind if the plate is a member for transmitting only a specific direction of wave motions of light. It is possible to use a member which is generally known as a polarizing plate for liquid crystal display.

(3) Liquid Crystal Layer

Next, the liquid crystal layer used in the present invention will be explained. The liquid crystal layer used in the present invention comprises a ferroelectric liquid crystal filled between the first alignment substrate and the second alignment substrate.

(Ferroelectric Liquid Crystal)

The ferroelectric liquid crystal used for the liquid crystal layer is not particularly limited as long as it shows the chiral smectic C (SmC*) phase. A material having the phase change of the cholesteric (Ch) phase-smectic A (SmA) phase-chiral smectic C (SmC*) phase in the temperature cooling process can also be used. Furthermore, a material having the phase change of the Ch phase-SmC* phase without transition to the SmA phase can also be used. In particular, as the ferroelectric liquid crystal used in the present invention, one showing the latter phase transition sequence without the transition to the SmA phase is preferable. A ferroelectric liquid crystal showing such a phase transition sequence tends to show the mono-stability driving characteristics, and by using such a material showing the mono-stability driving characteristics, the graduation display is enabled so that a highly precise liquid crystal display for the color display can easily be obtained.

In the case the liquid crystal display of the present invention is driven by the field sequential color system, among the ferroelectric liquid crystals showing the mono-stability driving characteristics as mentioned above, it is preferable to use a ferroelectric liquid crystal of the half-V-shaped drive with the liquid crystal molecules operated only at the time either a positive voltage or a negative voltage is applied. By using a ferroelectric liquid crystal having such characteristics, the aperture time of the black and white shutter can be made longer so that a liquid crystal display of the bright color display can be obtained.

Moreover, the ferroelectric liquid crystal used in the invention is preferably one constituting a single phase. The word "constituting a single phase" means that a polymer network, as formed by the polymer stabilization method or the like, is not formed. Such use of the ferroelectric liquid crystal of a single phase makes it possible to simplify the production process and lowering the driving voltage.

As it will be described later, a polymer network may be formed in the liquid crystal layer used in the present invention.

As the specific examples of such a ferroelectric liquid crystal, "R2301", "FELIX-3206" commercially available from AZ Electronic Materials can be presented.

(Liquid Crystal Layer)

The thickness of the liquid crystal layer made of the above-mentioned ferroelectric liquid crystal is preferably from 1.2 µm to 3.0 µm, more preferably from 1.3 µm to 2.5 µm, even more preferably from 1.4 µm to 2.0 µm. If the thickness of the liquid crystal layer is too thin, the contrast may lower. Conversely, if the thickness is too thick, the liquid crystal may not be aligned with ease.

As the method for forming the liquid crystal, a method which is generally used as a method for forming a liquid crystal cell can be used. For example, the liquid crystal layer can be formed, by making use of capillary effect to inject an isotropic liquid obtained by heating, the above-mentioned ferroelectric liquid crystal into a liquid crystal cell, which is formed by forming electrodes beforehand on a substrate and arranging the above-mentioned photo alignment layer, and then sealing the cell with an adhesive agent. The thickness of the liquid crystal layer can be adjusted with spacers such as beads.

According to the liquid crystal layer used in the present invention, a polymer network may be formed. That is, the liquid crystal layer may contain a polymerization product of a polymerizable monomer. Thereby, the sequence of the ferroelectric liquid crystal can further be stabilized.

The polymerizable monomer used for the polymerization product of the polymerizable monomer is not particularly limited as long as it is a compound capable of generating a polymerization product by the polymerization reaction. As such a polymerizable monomer, a thermosetting resin monomer capable of generating the polymerization reaction by the thermal treatment, and an active radiation curable resin monomer capable of generating the polymerization reaction by the irradiation of an active radiation can be presented. In particular, in the present invention, it is preferable to use an active radiation curable resin monomer. Since the thermosetting resin monomer requires the thermal treatment for generating the polymerization reaction, the regular sequence of the ferroelectric liquid crystal may be deteriorated or the phase transition may be induced by the thermal treatment. On the other hand, the active radiation curable resin monomer does not involve such a risk so that the sequence of the ferroelectric liquid crystal may hardly be deteriorated by the generation of the polymerization reaction.

As the active radiation curable resin monomer, an electron beam curable resin monomer capable of generating the polymerization reaction by the electron beam irradiation, and a photosetting resin monomer capable of generating the polymerization reaction by the light irradiation can be presented. In particular, according to the present invention, it is preferable to use a photosetting resin monomer. By using the photosetting resin monomer, the manufacturing method of the liquid crystal display of the present invention can be simplified.

The above-mentioned photosetting resin monomer is not particularly limited as long as it can generate the polymerization reaction by the irradiation of a light beam having the wavelength in a range of 150 nm to 500 nm. In particular, according to the present invention, it is preferable to use an ultraviolet ray curable resin monomer capable of generating the polymerization reaction by the irradiation of a light beam having the wavelength in a range of 250 nm to 450 nm, in particular, in a range of 300 nm to 400 nm because it is advantageous in terms of the irradiation device convenience, or the like.

The polymerizable functional group of the ultraviolet ray curable resin monomer is not particularly limited as long as it can generate the polymerization reaction by the irradiation of an ultraviolet ray of the wavelength range mentioned above. According to the present invention, it is preferable to use an ultraviolet ray curable resin monomer having an acrylate group.

The above-mentioned ultraviolet ray curable resin monomer may either be a monofunctional monomer having a polymerizable functional group in a molecule or a polyfunctional monomer having two or more polymerizable functional group in a molecule. In particular, according to the present invention, it is preferable to use a polyfunctional monomer. By using the polyfunctional monomer, since a stronger polymer network can be formed in the liquid crystal layer, the interatomic force and the polymer network at the first alignment layer interface can be reinforced. Therefore, by using the polyfunctional monomer, disturbance of the sequence of the ferroelectric liquid crystal by the temperature change of the liquid crystal layer can be restrained.

According to the present invention, among the polyfunctional monomers, a bifunctional monomer having a polymerizable functional group at both ends of the molecules is preferable. Since the functional groups on the both ends of the molecules, a polymer network with a wide interval between the polymers can be formed so that the decline of the driving voltage of the ferroelectric liquid crystal due to the presence of the polymerization product of the polymerizable monomers in the liquid crystal layer can be prevented.

According to the present invention, among the ultraviolet ray curable resin monomers, it is preferable to use a ultraviolet ray curable liquid crystal monomer capable of showing the liquid crystal property. Such an ultraviolet ray curable liquid crystal monomer is preferable for the following reasons. That is, since the ultraviolet ray curable liquid crystal monomer shows the liquid crystal property, it can be arranged regularly by the alignment limiting force of the first alignment layer or second alignment layer. Therefore, by generating the polymerization reaction after regularly arranging the ultraviolet ray curable liquid crystal monomers, they can be fixed while maintaining the regular arrangement state in the liquid crystal layer. Owing to the presence of the polymerization product having the regular arrangement state in the liquid crystal layer, the sequence stability of the ferroelectric liquid crystal can be improved so that the excellent heat resistance and impact resistance can be provided to the liquid crystal display of the present invention.

The liquid crystal phase shown by the ultraviolet ray curable liquid crystal monomer is not particularly limited. For example, the nematic phase, the SmA phase and the SmC phase can be presented.

As the ultraviolet ray curable liquid crystal monomers used in the present invention, for example, the compounds represented by the following formula can be presented.

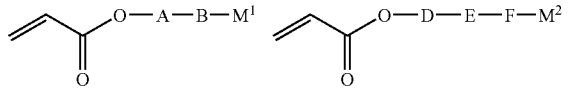

In the formula, A, B, D, E and F, which may have a substituent such as a halogen, represent a benzene, a cyclohexane or a pyrimidine. Moreover, A and B, or D and E may be coupled via a coupling group such as an acetylene group, a methylene group and an ester group. $M^1$ and $M^2$ may be any of a hydrogen atom, an alkyl group having 3 to 9 carbon atoms, an alkoxy carbonyl group having 3 to 9 carbon atoms, or a cyano group. Furthermore, an acryloyloxy group at the molecule chain end and A or D may be coupled via a spacer such as an alkylene group having 3 to 6 carbon atoms.

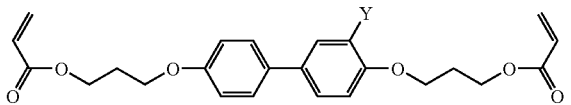

In the formula, Y represents hydrogen, an alkyl having 1 to 20 carbon atoms, an alkenyl having 1 to 20 carbon atoms, an alkyloxy having 1 to 20 carbon atoms, an alkyloxy carbonyl having 1 to 20 carbon atoms, a formyl, an alkyl carbonyl having 1 to 20 carbon atoms, an alkyl carbonyloxy having 1 to 20 carbon atoms, a halogen, a cyano or a nitro.

Among the compounds represented by the formulae, as the specific compounds to be used preferably in the present invention, the compounds of the following formulae can be presented.

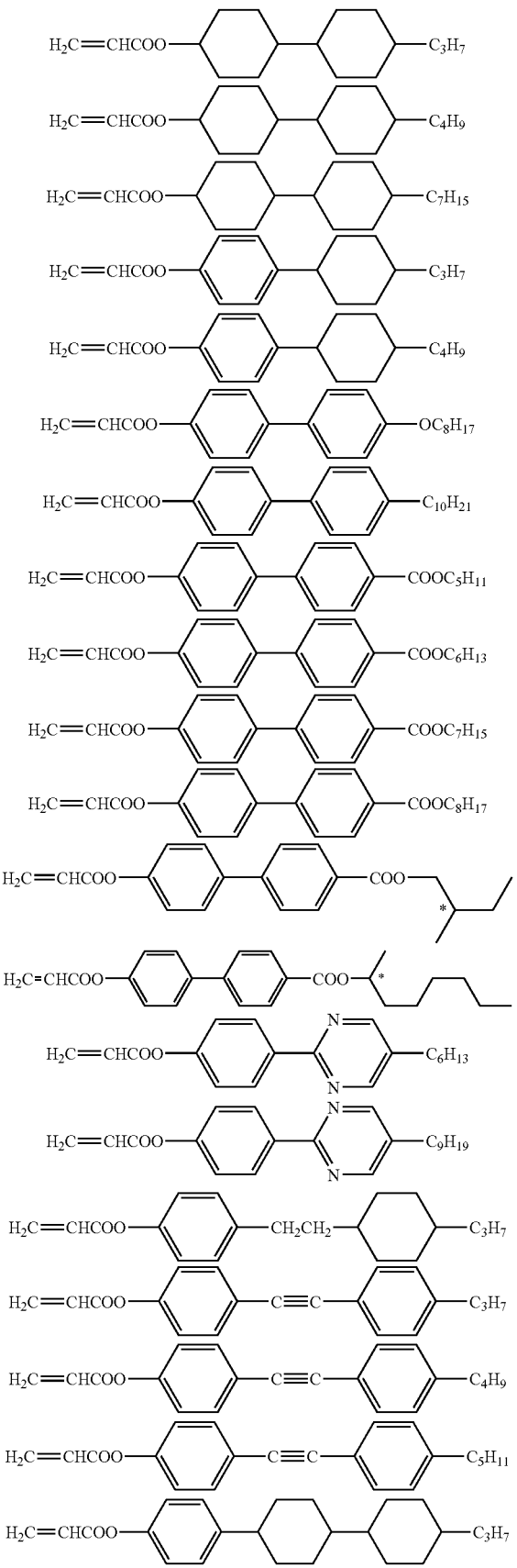

-continued

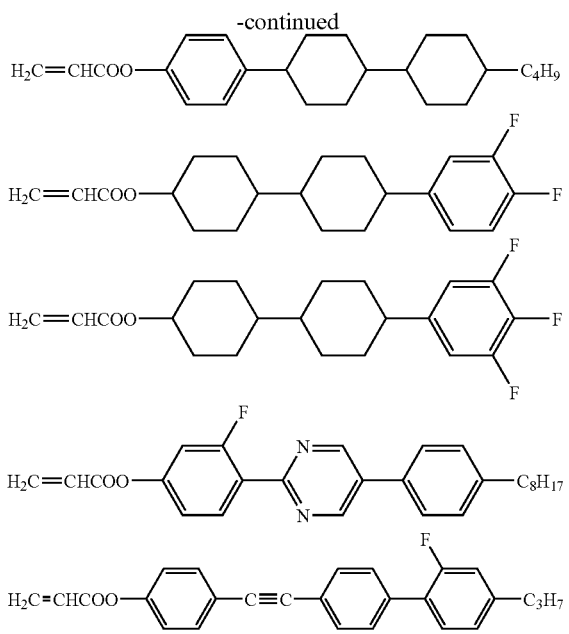

The polymerization product of the polymerizable monomers used in the present invention may either be a polymerization product of a single polymerizable monomer, or a polymerization product of two or more different polymerizable monomers. In the case of a polymerization product of two or more different polymerizable monomers, for example, a polymerization product of the ultraviolet ray curable liquid crystal monomer and another ultraviolet ray curable resin monomer can be presented.

In the case the ultraviolet ray curable liquid crystal monomer is used as the polymerizable monomer, a polymerization product of the polymerizable monomers used in the present invention may be a main chain liquid crystal polymer with the main chain showing the liquid crystal property owing to the presence of an atomic group showing the liquid crystal property in the main chain, moreover, it may be a side chain liquid crystal polymer with the side chain showing the liquid crystal property owing to the presence of an atomic group showing the liquid crystal property in the side chain. In particular, according to the present invention, it is preferably a side chain liquid crystal polymer. Since the degree of freedom of the atomic group can be higher owing to the presence of the atomic group showing the liquid crystal property in the side chain, the atomic group showing the liquid crystal property can easily be aligned in the liquid crystal layer. Moreover, consequently, the alignment stability of the ferroelectric liquid crystal in the liquid crystal layer can be improved.

The amount of the polymerization product of the polymerizable monomer present in the liquid crystal layer is not particularly limited as long as it is in a range capable of having the sequence stability of the ferroelectric liquid crystal to a desired degree. In general, it is preferably in a range of 0.5% by mass to 30% by mass in the liquid crystal player, in particular it is preferably in a range of 1% by mass to 20% by mass, and especially it is preferably in a range of 1% by mass to 10% by mass. In the case it is more than the range, increase of the driving voltage of the ferroelectric liquid crystal or the deterioration of the response speed may be brought about. Moreover, in the case it is less than the range, due to the insufficiency of the sequence stability of the ferroelectric liquid crystal, the heat resistance or the impact resistance of the liquid crystal display of the present invention may be deteriorated.

Here, the amount of the polymerization product of the polymerizable monomer present in the liquid crystal layer can be calculated from the residual amount found by measuring with an electronic force balance the weight of the polymerization product of the polymerizable monomer remaining after washing out the single molecule liquid crystals in the liquid crystal layer with a solvent and the total mass of the liquid crystal layer.

In the liquid crystal layer used in the present invention, another compound may be included within a range not deteriorating the purpose of the present invention. As such a compound, an unreacted polymerizable monomer, a photo polymerization initiating agent, a reaction initiating agent, a reaction inhibiting agent, or the like can be presented.

(4) Manufacturing Method of the Liquid Crystal Display

Next, the manufacturing method of the liquid crystal display of the present invention will be explained. As the manufacturing method of the liquid crystal display of the present invention, a method commonly known as a manufacturing method of the liquid crystal display can be used, and thus it is not particularly limited.

As an example of the manufacturing method of the liquid crystal display of the present invention, the case of providing an active matrix system liquid crystal display using the TFT elements will be explained.

First, a transparent conductive film is formed by the deposition method mentioned above on the first base material so as to provide the entire surface common electrode. On the other hand, a switching element and a pixel electrode are provided onto the second base material by patterning a conductive film in a matrix so as to form a x electrode and a y electrode. As mentioned above, the columnar alignment layer or the second alignment layer is formed each on the electrode layers accordingly formed on the first base material and the second base material. With beads dispersed as a spacer on the surface of one of the formed columnar alignment layer and second alignment layer and a sealing material coated on the other, the first alignment substrate and the second alignment substrate are attached such that the columnar alignment layer of the first alignment substrate and the second alignment layer of the second alignment substrate face with each other so as to be thermally pressed. After the thermal pressing operation, the ferroelectric liquid crystal is heated and injected in an isotropic phase or nematic phase state, utilizing the capillary effect from the injection opening, and the injection opening is sealed with an ultraviolet ray curable resin, or the like. Thereafter, by align the ferroelectric liquid crystal while gradually cooling down the same, a liquid crystal display of the present invention can be obtained.

Moreover, according to the present invention, the liquid crystal display can be produced using the polymer stabilization method. In this case, a liquid crystal layer can be formed by a liquid crystal sealing process of sealing a liquid crystal layer forming composition including a ferroelectric liquid crystal and a polymerizable monomer between the first alignment substrate and the second alignment substrate, a liquid crystal alignment process of having the ferroelectric liquid crystal in the chiral smectic C phase state, and a polymerizing process of polymerizing the polymerizable monomer with the ferroelectric liquid crystal in the chiral smectic C phase.

In the liquid crystal sealing process, the method of sealing the liquid crystal layer forming composition including the ferroelectric liquid crystal and the polymerizable monomer is not particularly limited. For example, it can be sealed by heating the liquid crystal layer forming composition so as to process the ferroelectric liquid crystal in the liquid crystal layer forming composition into an isotropic liquid, and injecting the same utilizing the capillary effect from the injection opening of a liquid crystal cell produced preliminarily using the first alignment substrate and the second alignment substrate. In this case, the injection opening is sealed with an adhesive.

At the time, the amount of the polymerizable monomer included in the liquid crystal layer forming composition can be determined optionally according to the amount necessary for the sequence stabilization of the ferroelectric liquid crystal after the formation or the liquid crystal layer. In particular, according to the present invention, it is preferably in a range of 0.5% by mass to 30% by mass in the liquid crystal layer forming composition, it is particularly preferably in a range of 1% by mass to 20% by mass, and it is especially preferably in a range of 1% by mass to 10% by mass. In the case the polymerizable monomer content is more than the range, the liquid crystal layer performance may be deteriorated due to the high driving voltage of the ferroelectric liquid crystal after the formation of the liquid crystal layer. Moreover, in the case it is lower than the range, as a result of the insufficient sequence stabilization of the ferroelectric liquid crystal, the heat resistance, the impact resistance, or the like of the liquid crystal display can be lowered.

Moreover, at the time of sealing the liquid crystal layer forming composition, the ferroelectric liquid crystal is heated to the transition temperature from the chiral smectic C phase to the nematic phase or higher. The temperature may be the transition temperature form the chiral smectic C phase to the nematic phase. In general, the ferroelectric liquid crystal is heated into the state of the isotropic phase or the nematic phase. As to the specific temperature, it differs depending on the kind of the ferroelectric liquid crystal, and thus it can be selected optionally.

Next, in the liquid crystal alignment process, the sealed ferroelectric liquid crystal is cooled down. At the time, in general the ferroelectric liquid crystal is cooled down gradually to the room temperature (about 25° C.).

Moreover, in the polymerizing process, the method for polymerizing the polymerizable monomer can be determined optionally according to the kind of the polymerizable monomer. For example, in the case an ultraviolet ray curable resin monomer is used as the polymerizable monomer, polymerization can be carried out by the ultraviolet ray irradiation.

The polymerizable monomer can be polymerized either in a state with the voltage applied to the liquid crystal layer or in a state without the voltage application. In the present invention, it is preferable to carry out the polymerization in a state without the voltage application because the production process can be simplified further by the polymerization without the voltage application.

(5) Liquid Crystal Display

Since the liquid crystal display of the present invention accordingly obtained uses the columnar alignment layer having the alignment function and the polarizing function as the first alignment layer, visualization can be enabled without the use of the polarizing plate on the first alignment layer side so that the light scattering generated at the interface between the liquid crystal display and the polarizing plate can be solved so that the deterioration of the light transmittance can be restrained. Moreover, since the polarizing plate needs not be used on the first alignment layer side, the liquid crystal display of the present invention can achieve a thin shape and a light weight so that the liquid crystal display enables the cutback of the production cost. Since the columnar alignment layer used in the liquid crystal display of the present invention is formed utilizing the self organization of the plate-like molecules, it can be formed by a simple method without the need of the alignment process such as the rubbing process and the photo alignment process, and thus the liquid crystal display of the present invention is highly practical.

The liquid crystal display of the present invention can also align the ferroelectric liquid crystal without generating the alignment defect such as the double domain so as to enable the graduation display, and thus it can be used as a highly precise color liquid crystal display.

The liquid crystal display of the invention, in particular, is suitable since it is driven by the color filter system or the field sequential color system. Among them, it is preferred to drive the liquid crystal display of the invention by the field sequential color system. The field sequential color system is for enabling the color display by switching on or off the liquid crystal synchronously with flickering of the LED of the three colors of red, green and blue without the use of a color filter. Thereby, a bright, highly precise color moving image display can be realized with a low power consumption, a low cost and a wide view angle. By using a material undergoing half-V-shaped driving, in which liquid crystal molecules thereof work only when either one of positive and negative voltages is applied thereto, it is possible to make light leakage less when dark regions operate (when a black and white shutter is closed), and make the aperture time of the black and white shutter sufficiently long. This makes it possible to display respective colors switched with time more brightly to realize bright color liquid crystal display.

The present invention is not limited to the above-mentioned embodiments. The embodiments are examples, and all modifications having substantially the same structure and producing the same effects and advantages as the technical concept recited in the claims of the present invention are included in the technical scope of the invention.

EXAMPLES

Hereinafter, the present invention will be explained further specifically with reference to the examples.

Example 1

As the photo dimerization-reactive compound, the below-mentioned compound 1 was used.

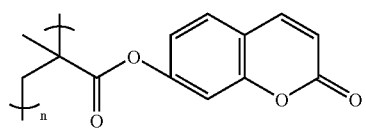

(Production of the First Alignment Substrate)

By coating with a die coater, an ink containing the plate-like molecules having the photo dichroism in the visible light range (produced by Optiva, Inc., N015) onto the ITO film of a glass substrate having an ITO electrode, washed well, and drying, it was soaked in a 15% barium chloride aqueous solution for about 1 second. By further washing and drying again, a first alignment substrate having a 0.3 μm thickness columnar alignment layer was obtained.

(Production of the Second Alignment Substrate)

A solution produced by dissolving in a cyclopentanone the compound 1 to have the 2% by weight concentration was spin coated onto the ITO film of a glass substrate having an ITO electrode, washed well, by 4,000 rpm for 30 seconds. After drying, a 200 mJ/cm$^2$ non polarized ultraviolet ray was irradiated from the glass substrate side for forming a photo alignment layer so as to obtain a second alignment substrate.

(Formation of the Liquid Crystal Layer)

With 1.5 µm diameter bead spacer scattered on the columnar alignment layer of the first alignment substrate and a sealing material coated on the photo alignment layer of the second alignment substrate using a seal dispenser, the first alignment substrate and the second alignment substrate were attached in a state disposed such that the polarization direction of the columnar alignment layer of the first alignment substrate and the alignment direction of the photo alignment layer of the second alignment substrate are same and the columnar alignment layer and the photo alignment layer face with each other. By carrying out the thermal pressing at 150° C. for about 1 hour, a test cell was produced. By injecting a ferroelectric liquid crystal (produced by AZ Electronic Materials, R2301) into the test cell by the about 100° C. temperature condition and cooling down the same gradually, a mono domain even alignment was obtained.

Example 2

Formation of the Concave Part Pattern

An ultraviolet ray curable acrylate resin of the below-mentioned composition was spin coated onto a glass substrate having an ITO electrode, washed well. With an original plate with the ruggedness formed by the electron beam drawing method placed thereon, a 100 kg/cm$^2$ load was applied for 1 minute. After directing an ultraviolet ray by 100 mJ/cm$^2$ in this state and removing the original plate, an ultraviolet ray was directed by 3,000 mJ/cm$^2$ so as to form a concave part pattern having a 0.2 µm width, a 0.4 µm pitch and a 0.2 µm depth. By applying the plasma process thereto, the hydrophilic process was carried out on the surface.

(Composition of the Ultraviolet Ray Curable Acrylate Resin)

Gohselac UV-7500B (produced by Nippon Synthetic Chemical Industry Co., Ltd.) 40 parts by weight 1,6-hexane diol acrylate (produced by NIPPON KAYAKU CO., LTD) 35 parts by weight Pentaerythritol acrylate (produced by TOAGOSEI Co., Ltd.) 21 parts by weight 1-hydroxy cyclohexyl phenyl ketone (produced by Chiba Specialty Chemicals) 2 parts by weight Benzo phenone (produced by NIPPON KAYAKU CO., LTD) 2 parts by weight (Production of the First Alignment Substrate Having a Concave Part Pattern)

After coating an ink containing the plate-like molecules having the photo dichroism in the visible light range (produced by Optiva, Inc., N015) onto the concave pattern produced by the method mentioned above using the ink jet and drying, it was soaked in a 15% barium chloride aqueous solution for about 1 second. By further washing and drying the same again, a first alignment substrate having a columnar alignment layer with a 0.3 µm thickness of the portion with the column structure formed was obtained.

(Formation of the Liquid Crystal Layer)

With 1.5 µm diameter bead spacer scattered on the columnar alignment layer of the first alignment substrate and a sealing material coated on the photo alignment layer of the second alignment substrate same as that produced in the example 1 using a seal dispenser, the first alignment substrate and the second alignment substrate were attached in a state disposed such that the polarization direction of the columnar alignment layer of the first alignment substrate and the alignment direction of the photo alignment layer of the second alignment substrate are same and the columnar alignment layer and the photo alignment layer face with each other. By carrying out the thermal pressing at 150° C. for about 1 hour, a test cell was produced. By injecting a ferroelectric liquid crystal (produced by AZ Electronic Materials, R2301) into the test cell by the about 100° C. temperature condition and cooling down the same gradually, a mono domain even alignment was obtained.

Example 3

With the same conditions as in the example 1, a test cell was produced. A liquid crystal prepared by mixing 5% by mass of a polymerizable monomer (produced by DAINIPPON INK AND CHEMICALS, Inc. UCL-001) to a ferroelectric liquid crystal (produced by AZ Electronic Materials, R2301) was injected into the test cell by the about 100° C. temperature condition and cooled down the same gradually. Thereafter, by the exposure with a non polarized ultraviolet ray by about 1,000 mJ/cm$^2$, the polymerizable monomer was polymerized. In the liquid crystal display obtained accordingly, a mono domain even alignment was obtained.

What is claimed is:

1. A liquid crystal display comprising a first alignment substrate having a first base material, a first electrode layer formed on the first base material and a first alignment layer formed on the first electrode layer, and a second alignment substrate having a second base material, a second electrode layer formed on the second base material, and a second alignment layer formed on the second electrode layer, disposed such that the first alignment layer and the second alignment layer face with each other, with a ferroelectric liquid crystal interposed between the first alignment substrate and the second alignment substrate, wherein the first alignment layer has a column structure which has plate-like molecules having a photo dichroism in a visible light range laminated with normal directions of the plate-like molecules aligned in a certain direction, and it is a columnar alignment layer having an alignment function and a polarizing function.

2. The liquid crystal display according to claim 1, wherein the columnar alignment layer comprises a resin layer with a concave part having a predetermined width formed in a pattern on a surface of the resin layer, and the column structure formed along the concave part of the resin layer.

3. The liquid crystal display according to claim 1, wherein the plate-like molecules show a lyotropic liquid crystal phase in an aqueous solution.

4. The liquid crystal display according to claim 2, wherein the plate-like molecules show a lyotropic liquid crystal phase in an aqueous solution.

5. The liquid crystal display according to claim 2, wherein the second alignment layer is a photo alignment layer.

6. The liquid crystal display according to claim 2, wherein the ferroelectric liquid crystal shows mono-stability driving characteristics.

7. The liquid crystal display according to claim 2, wherein the ferroelectric liquid crystal shows a phase transition sequence without a smectic A phase in a temperature cooling process.

8. The liquid crystal display according to claim 2, comprising thin film transistors in the first electrode layer or the second electrode layer, and it is driven by an active matrix drive.

9. The liquid crystal display according to claim 2, driven by a field sequential color system.

10. The liquid crystal display according to claim 1, wherein the second alignment layer is a photo alignment layer.

11. The liquid crystal display according to claim 1, wherein the ferroelectric liquid crystal shows mono-stability driving characteristics.

12. The liquid crystal display according to claim 1, wherein the ferroelectric liquid crystal shows a phase transition sequence without a smectic A phase in a temperature cooling process.

13. The liquid crystal display according to claim 1, comprising thin film transistors in the first electrode layer or the second electrode layer, and it is driven by an active matrix drive.

14. The liquid crystal display according to claim 1, driven by a field sequential color system.

15. The liquid crystal display according to claim 1, wherein the columnar alignment layer comprises a resin layer with a convex part having a predetermined width formed in a pattern on a surface of the resin layer, and the column structure formed on the resin layer.

* * * * *